US008282469B2

(12) United States Patent
Inamura

(10) Patent No.: US 8,282,469 B2
(45) Date of Patent: Oct. 9, 2012

(54) GAMING MACHINE ACCEPTING SIDE BET AND CONTROL METHOD THEREOF

(75) Inventor: Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1007 days.

(21) Appl. No.: 12/266,257

(22) Filed: Nov. 6, 2008

(65) Prior Publication Data

US 2009/0215529 A1 Aug. 27, 2009

Related U.S. Application Data

(60) Provisional application No. 61/031,210, filed on Feb. 25, 2008.

(51) Int. Cl.
*A63F 9/24* (2006.01)
*G06F 17/00* (2006.01)

(52) U.S. Cl. ................ 463/25; 463/16; 463/40; 463/42; 273/274; 273/309

(58) Field of Classification Search ........................ None
See application file for complete search history.

(56) References Cited

U.S. PATENT DOCUMENTS

| | | | | |
|---|---|---|---|---|
| 5,263,715 | A * | 11/1993 | Matsumoto et al. | 463/22 |
| 5,413,351 | A * | 5/1995 | Franklin | 273/274 |
| 5,879,006 | A * | 3/1999 | Bowling | 273/274 |
| 6,364,314 | B1 * | 4/2002 | Canterbury | 273/274 |
| 6,394,901 | B1 * | 5/2002 | Marta | 463/20 |
| 6,422,563 | B1 * | 7/2002 | Fairchild et al. | 273/274 |
| 6,464,225 | B1 * | 10/2002 | Webb | 273/274 |
| 6,688,597 | B2 * | 2/2004 | Jones | 273/274 |
| 7,255,350 | B2 * | 8/2007 | Timmons, Sr. | 273/274 |
| 8,074,991 | B2 * | 12/2011 | Chen et al. | 273/274 |
| 2001/0034264 | A1 * | 10/2001 | Berman et al. | 463/22 |
| 2002/0111208 | A1 * | 8/2002 | Marta | 463/20 |
| 2003/0207706 | A1 * | 11/2003 | Potter et al. | 463/16 |
| 2003/0218300 | A1 * | 11/2003 | Timmons, Sr. | 273/146 |
| 2005/0086697 | A1 * | 4/2005 | Haseltine | 725/100 |
| 2006/0163807 | A1 * | 7/2006 | Crenshaw et al. | 273/146 |
| 2007/0026947 | A1 | 2/2007 | Chun | |
| 2007/0066380 | A1 * | 3/2007 | Miura | 463/16 |
| 2008/0070667 | A1 * | 3/2008 | Lutnick et al. | 463/16 |
| 2008/0132316 | A1 * | 6/2008 | Fisher et al. | 463/17 |
| 2008/0214274 | A1 * | 9/2008 | Thomas et al. | 463/20 |

FOREIGN PATENT DOCUMENTS

WO WO 2007/016776 A1 2/2007

* cited by examiner

*Primary Examiner* — Paul A D'Agostino
(74) *Attorney, Agent, or Firm* — Lexyoume IP Meister, PLLC.

(57) ABSTRACT

A gaming machine of the present invention comprises: a gaming portion where plural dice roll and stop; a memory; a station having an input device accepting a normal BET and a side BET that can be placed on the order of whether the total value of the outcomes of the dice in each game of a plurality of games is even or odd; and a controller programmed to execute the processing of (F) determining whether the total value of the outcomes of the plurality of dice is even or odd, (G) storing even-odd information showing the even or odd value determined in the processing (F) into the memory, and (H) offering a special payout, when the accepted side BET matches the order of even or odd values determined by the stored even-odd information.

7 Claims, 15 Drawing Sheets

GAMING MACHINE ACCEPTING SIDE BET AND CONTROL METHOD THEREOF

CROSS-REFERENCE TO RELATED APPLICATIONS

This application claims benefit of priority based on U.S. Provisional Patent Application No. 61/031,210 filed on Feb. 25, 2008. The contents of this application are incorporated herein by reference in their entirety.

BACKGROUND OF THE INVENTION

1. Field of the Invention

The present invention relates to a gaming machine accepting a side BET and a control method thereof.

2. Discussion of the Background

There have been conventionally known a variety of table games, and for example, as disclosed in WO 07/016776-A1, US 2007/0026947-A1, and U.S. Pat. No. 5,413,351, a game genre called a dice game exists among those table games.

Among the dice games, there exists, for example, a gaming method in which a dealer throws dice after a player has performed a BET operation, and in the case where the dealer throws a predetermined combination, the player can throw dice to obtain a high payout, as disclosed in U.S. Pat. No. 5,413,351. Further, in Asia, Sic Bo is known as a long-time familiar dice game in which a player places a BET based on a prediction of the outcomes of three dice.

Sic Bo is widely known as an ancient Chinese dice game. In Sic Bo, a player places a BET based on a prediction of the outcomes of the respective three dice or a combination of the outcomes of the three dice. The way of placing a BET and payout rates are displayed on a table where a player is seated (or they may be displayed to an image display). The table is provided with: an area for placing a BET based on a prediction of the outcome of one die; an area for placing a BET based on a prediction that the outcomes of two dice will be the same; an area for placing a BET based on a prediction that the outcomes of the three dice will be the same; an area for placing a BET based on a prediction of a combination of the outcomes of two dice; an area for placing a BET based on a prediction of the total value of the outcomes of the three dice; and the like. As for the payout, although it cannot be uniformly set due to different circumstances of regions, countries, or the like, it has been set to the degree of 1:1 to 1:180 according to an appearance probability.

Since the dice game disclosed in U.S. Pat. No. 5,413,351 is executed according to a particular rule, there has been a problem that the game is unfamiliar to the player and lacks interesting aspects. Further, in typical Sic Bo widely known, types of BETs are limited and hence it is difficult to increase the revenue per unit gaming machine.

An object of the present invention is to provide a gaming machine capable of enhancing interesting aspects of a game and increasing the revenue per unit gaming machine, and a control method of the gaming machine.

The contents of WO 07/016776-A1, US 2007/0026947-A1, and U.S. Pat. No. 5,413,351 are incorporated herein by reference in their entirety.

SUMMARY OF THE INVENTION

The present invention provides a gaming machine having the following configuration.

Namely, the gaming machine comprises: a gaming portion in which a plurality of dice roll and stop; a memory capable of storing data relating to a game; a station having an input device with which a normal BET and a side BET can be placed, the normal BET being able to be placed on the outcomes of the plurality of dice which stop in one game, the side BET being able to be placed on the order of whether the total value of the outcomes of the plurality of dice in each game of a plurality of games is even or odd; and a controller. The controller is programmed to execute the processing of (A) accepting the normal BET from the input device provided in the station, (B) accepting the side BET from the input device provided in the station, (C) storing side BET even-odd information showing the appearance order of even or odd values into the memory, based on the side BET accepted in the processing (B), (D) rolling and stopping the plurality of dice in the gaming portion, (E) offering a normal payout based on the outcomes of the plurality of dice stopped in the processing (D) and the normal BET accepted in the processing (A), (F) determining whether the total value of the outcomes of the plurality of dice is even or odd, based on the outcomes of the plurality of dice stopped in the processing (D) after having accepted the side BET in the processing (B), (G) storing even-odd information showing the even value or odd value determined in the processing (F) into the memory, in each game, and (H) offering a special payout, when the order of even or odd values shown by the side BET even-odd information stored into the memory in the processing (C) matches the order of even or odd values determined by all of the even-odd information stored into the memory in each game in the processing (G) after having accepted the side BET in the processing (B).

According to the above gaming machine, payouts for two types of BETs, that is, a normal payout for the normal BET and a special payout for the side BET, are prepared. Therefore, it is possible to make the player place a BET, with enjoyment of thinking about which BET to place and which payout to obtain so that the interesting aspects of the game can be improved.

Further, with the choices in betting increased, an amount to be betted per one game is expected to increase; thus, the revenue per unit game machine can be increased.

In the side BET, a BET is placed on the order of whether the total value of the outcomes of the dice in each game of the plurality of games is even or odd. Therefore, the player having placed the side BET continues the game until completion of the plurality of games. Hence it is possible to make the player play the game for a long period of time by making him or her place the side BET.

It is desirable that the gaming machine further has the following configuration.

The controller is further programmed to execute the processing of (I) determining whether or not all the outcomes of the plurality of dice stopped in the processing (D) are the same, and (J) clearing the side BET even-odd information stored into the memory in the processing (C), when determining in the processing (I) that all the outcomes of the plurality of dice are the same.

When it is determined that all the outcomes of the dice are the same, the side BET even-odd information is cleared. Namely, when all the outcomes of the dice become the same, a loss of the player having placed the side BET is settled. It is therefore possible to make the player having placed the side BET excited about whether or not all the outcomes of the dice will become the same.

Further, since a loss of the player having placed the side BET is settled when all the outcomes of the dice have become the same, benefit ratio of the gaming parlor is improved.

The present invention provides a gaming machine having the following configuration.

Namely, the gaming machine comprises: an image display capable of displaying an image; a memory capable of storing data relating to a game; a station having an input device with which a normal BET and a side BET can be placed, the normal BET being able to be placed on the outcomes of a plurality of dice stop-displayed in one game to the image display, the side BET being able to be placed on the order of whether the total value of the outcomes of the plurality of dice in each game of a plurality of games is even or odd; and a controller. The controller is programmed to execute the processing of (A) accepting the normal BET from the input device provided in the station, (B) accepting the side BET from the input device provided in the station, (C) storing side BET even-odd information showing the appearance order of even or odd values into the memory, based on the side BET accepted in the processing (B), (D) deciding the outcomes of the plurality of dice to be displayed to the image display, (E) displaying to the image display at least an image showing a state of stopping of the plurality of dice with the outcomes determined in the processing (D), (F) offering a normal payout based on the outcomes of the plurality of dice determined in the processing (D) and the normal BET accepted in the processing (A), (G) determining whether the total value of the outcomes of the plurality of dice is even or odd, based on the outcomes of the plurality of dice determined in the processing (D) after having accepted the side BET in the processing (B), (H) storing even-odd information showing the even value or odd value determined in the processing (G) into the memory, in each game, and (I) offering a special payout, when the order of even or odd values shown by the side BET even-odd information stored into the memory in the processing (C) matches the order of even or odd values determined by all of the even-odd information stored into the memory in each game in the processing (H) after having accepted the side BET in the processing (B).

According to the above gaming machine, payouts for two types of BETs, that is, a normal payout for the normal BET and a special payout for the side BET, are prepared. Therefore, it is possible to make the player place a BET, with enjoyment of thinking about which BET to place and which payout to obtain so that the interesting aspects of the game can be improved.

Further, with the choices in betting increased, an amount to be betted per one game is expected to increase; thus, the revenue per unit game machine can be increased.

In the side BET, a BET is placed on the order of whether the total value of the outcomes of the dice in each game of the plurality of games is even or odd. Therefore, the player having placed the side BET continues the game until completion of the plurality of games. Hence it is possible to make the player play the game for a long period of time by making him or her place the side BET.

It is desirable that the gaming machine further has the following configuration.

The controller is further programmed to execute the processing of (J) determining whether or not all the outcomes of the plurality of dice stopped in the processing (D) are the same, and (K) clearing the side BET even-odd information stored into the memory in the processing (C), when determining in the processing (J) that all the outcomes of the plurality of dice are the same.

When it is determined that all the outcomes of the dice are the same, the side BET even-odd information is cleared. Namely, when all the outcomes of the dice become the same, a loss of the player having placed the side BET is settled. It is therefore possible to make the player having placed the side BET excited about whether or not all the outcomes of the dice will become the same.

Further, since a loss of the player having placed the side BET is settled when all the outcomes of the dice have become the same, benefit ratio of the gaming parlor is improved.

The present invention further provides a control method of a gaming machine having the following configuration.

Namely, the control method comprises the steps of: (A) accepting a normal BET from an input device with which the normal BET and a side BET can be placed, the normal BET being able to be placed on the outcomes of a plurality of dice which stop in one game, the side BET being able to be placed on the order of whether the total value of the outcomes of the plurality of dice in each game of a plurality of games is even or odd, the input device being provided in a station; (B) accepting the side BET from the input device provided in the station; (C) storing side BET even-odd information showing the appearance order of even or odd values into a memory capable of storing data relating to a game, based on the side BET accepted in the step (B); (D) rolling and stopping the plurality of dice in a gaming portion in which the plurality of dice roll and stop; (E) offering a normal payout based on the outcomes of the plurality of dice stopped in the step (D) and the normal BET accepted in the step (A); (F) determining whether the total value of the outcomes of the plurality of dice is even or odd, based on the outcomes of the plurality of dice stopped in the step (D) after having accepted the side BET in the step (B); (G) storing even-odd information showing the even value or odd value determined in the step (F) into the memory, in each game, and (H) offering a special payout, when the order of even or odd values shown by the side BET even-odd information stored into the memory in the step (C) matches the order of even or odd values determined by all of the even-odd information stored into the memory in each game in the step (G) after having accepted the side BET in the step (B).

According to the control method of a gaming machine, payouts for two types of BETs, that is, a normal payout for the normal BET and a special payout for the side BET, are prepared. Therefore, it is possible to make the player place a BET, with enjoyment of thinking about which BET to place and which payout to obtain so that the interesting aspects of the game can be improved.

Further, with the choices in betting increased, an amount to be betted per one game is expected to increase; thus, the revenue per unit game machine can be increased.

In the side BET, a BET is placed on the order of whether the total value of the outcomes of the dice in each game of the plurality of games is even or odd. Therefore, the player having placed the side BET continues the game until completion of the plurality of games. Hence it is possible to make the player play the game for a long period of time by making him or her place the side BET.

The present invention further provides a control method of a gaming machine having the following configuration. Namely, the control method comprises the steps of: (A) accepting a normal BET from an input device with which that the normal BET and a side BET can be placed, the normal BET being able to be placed on the outcomes of a plurality of dice stop-displayed in one game to an image display capable of displaying an image, the side BET being able to be placed on the order of whether the total value of the outcomes of the plurality of dice in each game of a plurality of games is even or odd, the input device being provided in a station; (B) accepting the side BET from the input device provided in the station; (C) storing side BET even-odd information showing the appearance order of even or odd values into a memory capable of storing data relating to a game, based on the side BET accepted in the step (B); (D) determining the outcomes of the plurality of dice to be displayed to the image display; (E) displaying to the image display at least an image showing a state of stopping of the plurality of dice with the outcomes determined in the step (D); (F) offering a normal payout based on the outcomes of the plurality of dice determined in the step (D) and the normal BET accepted in the step (A); (G) determining whether the total value of the outcomes of the plurality of dice is even or odd, based on the outcomes of the plurality of dice determined in the step (D) after having accepted the side BET in the step (B); (H) storing even-odd information showing the even value or odd value determined in the step (G) into the memory, in each game, and (I) offering a special payout, when the order of even or odd values shown by the side BET even-odd information stored into the memory in the step (C) matches the order of even or odd values determined by all of the even-odd information stored into the memory in each game in the step (H) after having accepted the side BET in the step (B).

According to the control method of a gaming machine, payouts for two types of BETs, that is, a normal payout for the normal BET and a special payout for the side BET, are prepared. Therefore, it is possible to make the player place a BET, with enjoyment of thinking about which BET to place and which payout to obtain so that the interesting aspects of the game can be improved.

Further, with the choices in betting increased, an amount to be betted per one game is expected to increase; thus, the revenue per unit game machine can be increased.

In the side BET, a BET is placed on the order of whether the total value of the outcomes of the dice in each game of the plurality of games is even or odd. Therefore, the player having placed the side BET continues the game until completion of the plurality of games. Hence it is possible to make the player play the game for a long period of time by making him or her place the side BET.

DESCRIPTION OF THE EMBODIMENTS

Figure 1:
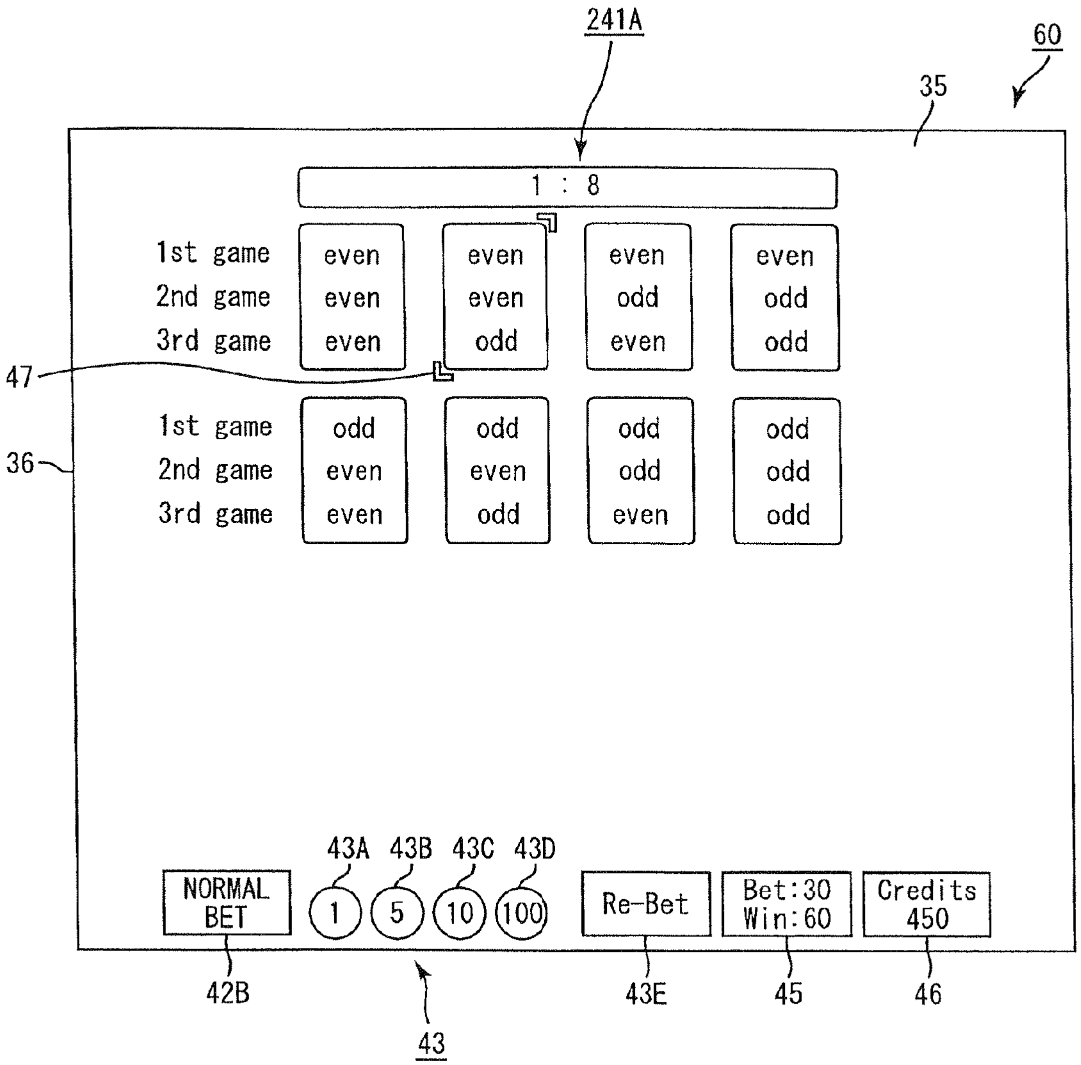
FIG. 1 is an exemplary view showing a display screen displayed to an image display.

FIG. 1 is a view showing a characteristic of a gaming machine of the present embodiment, and an exemplary view showing a display screen displayed to an image display.

Figure 2:
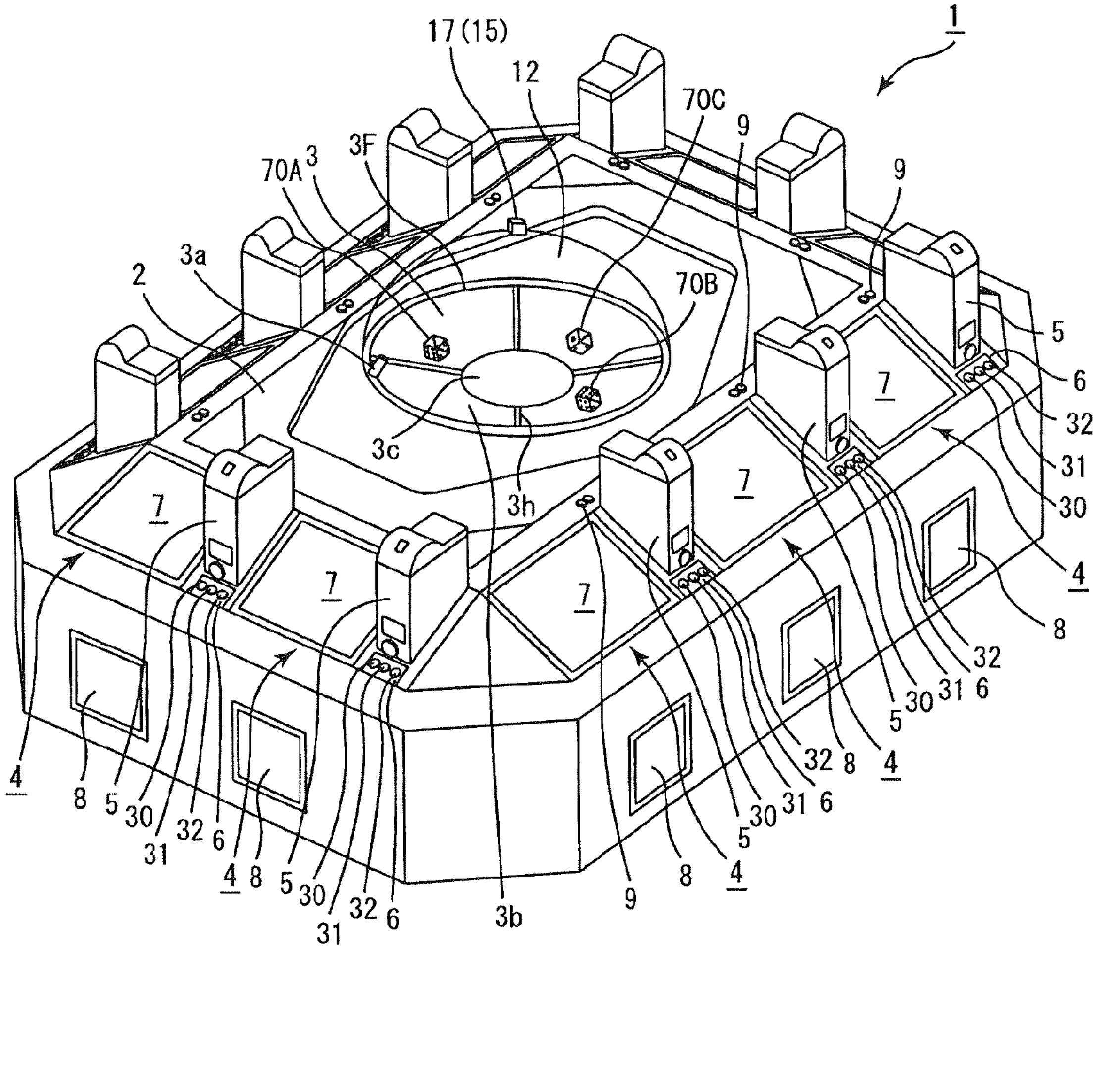
FIG. 2 is a perspective view schematically showing one example of a gaming machine according to the present invention.

FIG. 2 is a perspective view schematically showing one example of gaming machines according to the present invention.

As shown in FIG. 2, a gaming machine 1 according to the present embodiment includes: a cabinet 2 to be a body portion; a gaming portion 3 which is provided at the substantially central portion of the upper surface of the cabinet 2 and within which three dice 70 (a die 70A, a die 70B, and a die 70C) roll and stop; and a plurality of stations 4 provided so as to surround the gaming portion 3. Each of the stations 4 includes an image display 7. A player seated at each station 4 takes part in a game by entering a normal BET input in which a BET can be placed on the outcomes of the three dice 70 which stop in one game, and a side BET input in which a BET can be placed on the order of whether the total value of the outcomes of the dice 70 in each game of three games is even or odd.

In FIG. 1, a side BET screen 60 is displayed to the liquid crystal screen 36 provided in the image display 7. The side BET screen 60 is a screen for placing the side BET on the order of whether the total value of the outcomes of the dice 70 in each game of three games is even or odd.

The player can place the side BET at the time when the side BET screen 60 shown in FIG. 1 is displayed to the liquid crystal screen 36. When the side BET is placed, information on the side BET is stored as side BET information. The side BET information includes side BET even-odd information inputted by the player, which shows the appearance order of even or odd values.

After the side BET has been placed, the total value of the outcomes of the three dice 70 having stopped in the gaming portion 3 is calculated, and whether the total value is even or odd is determined. The determined result is then stored as even-odd information. Based on the even-odd information stored in the respective three games after the side BET has been placed, the order of even or odd values, which are the total values of the outcomes of the dice 70 in the respective three games, is determined. Then, it is determined whether the order of even or odd values shown by the stored side BET even-odd information matches the determined order of even or odd values. When it is determined that those orders match, a special payout is offered.

Figure 3:
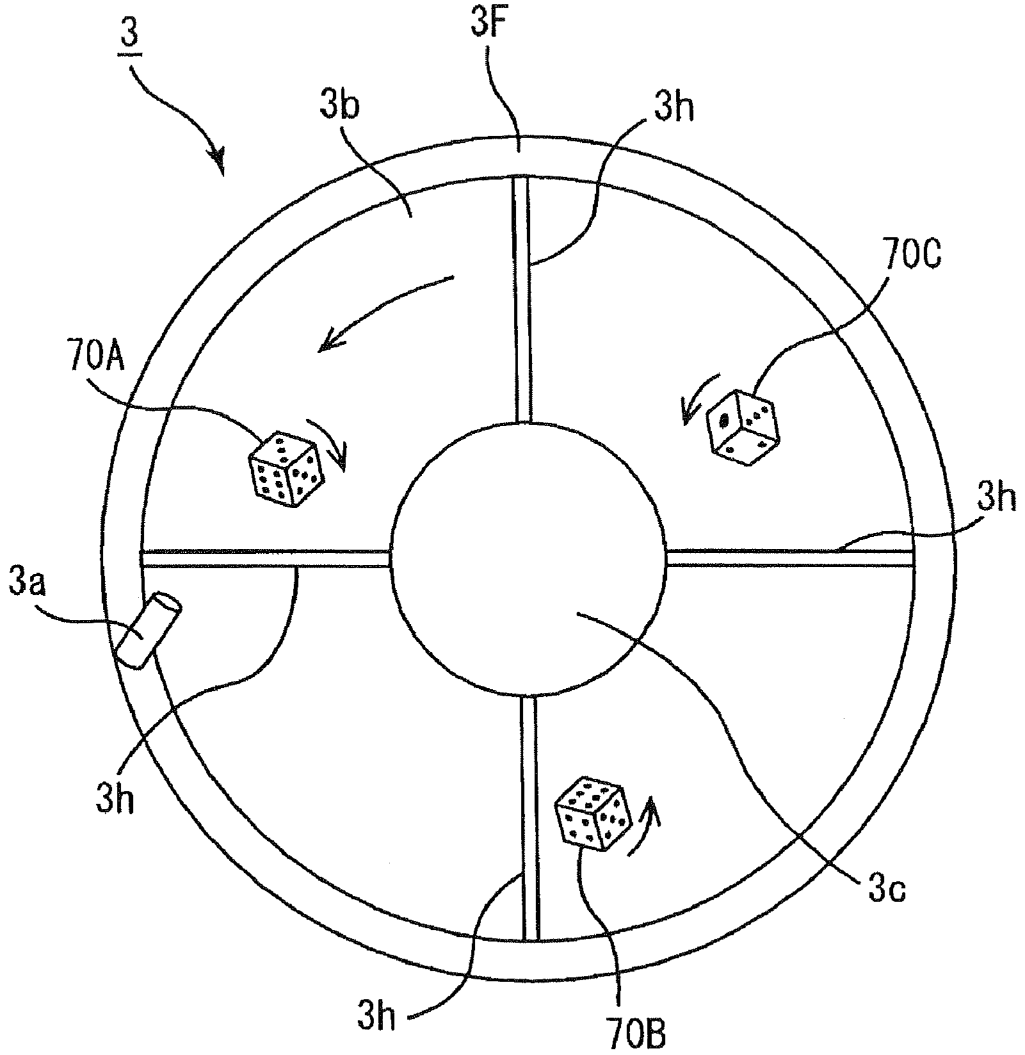
FIG. 3 is an enlarged view of a gaming portion of the gaming machine shown in FIG. 2.
Figure 4:
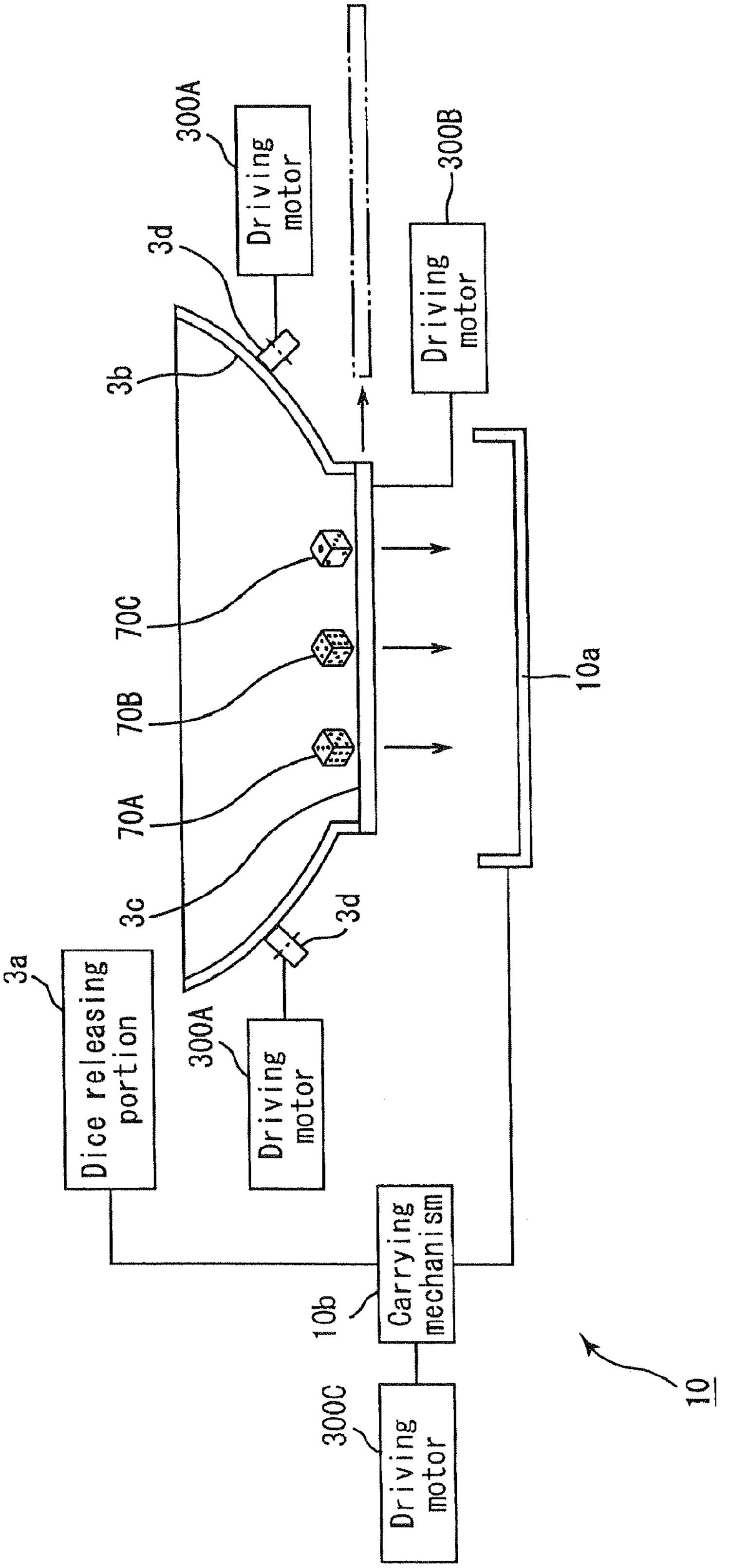
FIG. 4 is a view schematically showing a channel from collection to release of dice in the gaming portion.

FIG. 2 is the perspective view schematically showing one example of the gaming machines according to the present invention; FIG. 3 is an enlarged view showing the gaming portion of the gaming machine shown in FIG. 2; and FIG. 4 is a view schematically showing a channel from collection to release of the dice in the gaming portion.

The gaming machine 1 includes: the cabinet 2 to be the body portion; the gaming portion 3 which is provided at the substantially central portion of the upper surface of the cabinet 2 and in which the three dice 70 roll and stop; and the plurality of (10 units in the present embodiment) the stations 4 provided so as to surround the gaming portion 3.

Each of the stations 4 includes: a game media accepting device 5 into which game media such as medals for use in a game are inserted; a control portion 6 having a plurality of control buttons and the like, with which a player inputs predetermined commands; and the image display 7 to which an image regarding a BET table and the like are displayed. The player can participate in a game by operating the control portion 6 while watching the image displayed to the image display 7.

On the side surfaces of the cabinet 2 where the stations 4 are installed, there are provided for each station 4 a payout exit 8 from which the game media are paid out. Further, on the right side above the image display 7 of each station 4, speakers 9 capable of outputting a sound are provided.

The control portion 6 is provided beside the image display 7 of the station 4. In the control portion 6, a confirmation button 30, a payback button 31 and a help button 32 are arranged in the order from the left, when seen from a position facing to the station 4.

The confirmation button 30 is pressed when a BET operation is confirmed after the BET operation has been performed. Further, for operations other than the BET operations, the player also presses the confirmation button 30 to confirm an input that the player has entered.

The payback button 31 is typically pressed after a game has been ended. When the payback button 31 is pressed, game media according to credits owned by the player is paid back from the payout exit 8.

The help button 32 is pressed when the game playing manner or the like is unclear. Immediately after the help button 32 is pressed, a help image showing information on a variety of operations is displayed to the image display 7.

In the gaming portion 3, the plurality of the dice 70 are rolled and stopped. In the present embodiment, the gaming machine 1 has a configuration in which the three dice 70 (the die 70A, the die 70B and the die 70C) are used in the gaming portion 3.

The gaming portion 3 is formed in a circular shape and includes: a dice releasing portion 3*a* from which the dice 70 are released; a rotating plate 3*b* to rotate the dice 70 which are sequentially released from the dice releasing portion 3*a*; and a stopping plate 3*c* that finally stops the dice 70 rotating on the rotating plate 3*b*.

The dice releasing portion 3*a* is installed in a circular outer frame 3F configuring the gaming portion 3, and from here, the dice 70A to 70C are sequentially (or simultaneously) released toward the rotating plate 3*b*. It is to be noted that in FIGS. 2 and 3, the dice 70 are drawn in a large size as compared with the dice releasing portion 3*a* for the sake of facilitating the description.

The rotating plate 3*b* has a shape of a truncated cone, as shown in FIG. 4. On the lower surface portion of the rotating plate 3*b*, a plurality of driving rollers 3*d* are rotatably provided in a state in contact with the rotating plate 3*b*. Simultaneously with start of a game, the plurality of the rotating rollers 3*d* are rotationally driven by a rotating-plate driving motor 300A, to rotationally drive the rotating plate 3*b*. It is to be noted that on the front surface of the rotating plate 3*b*, projections 3*h* are provided at predetermined intervals, which flip the respective dice so as to facilitate rolling thereof when the rotating plate 3*b* is rotationally driven.

The stopping plate 3*c* is configured in a circular plate shape at the bottom portion of the rotating plate 3*b* having a shape of a truncated cone, and is an area where the dice 70 rotating on the rotating plate 3*b* finally stop after dropping along the inclination of the rotating plate 3*b* following the stop of the rotating plate 3*b*. Namely, the dice 70 released from the dice releasing portion 3*a* rotate on the surface of the rotating plate 3*b* by rotation of the rotating plate 3*b*, and drop along the inclination of the rotating plate 3*b* with the stop of the rotating plate 3*b*. Then, the dice 70 finally stop on the stopping plate 3*c*.

As shown in FIG. 4, the stopping plate 3*c* is configured to be slidingly driven by a stopping-plate driving motor 300B. With the stopping plate 3*c* slidingly driven, the dice 70 drop toward a collection/release mechanism 10.

The collection/release mechanism 10 includes: a housing portion 10*a* that receives the dice 70 having dropped from the stopping plate 3*c*; a carrying mechanism 10*b* that carries the dice 70 inside the housing portion 10*a* toward the dice releasing portion 3*a*; and a carriage driving motor 300C that drives the carrying mechanism 10*b*. The configuration of the collection/release mechanism 10 is not limited to a specific form, so long as it is a configuration capable of collecting the dice 70 after a later-described outcome detecting device 15 has completed detection of the outcomes of the respective dice 70 having stopped on the stopping plate 3*c*, and releasing the dice 70 from the dice releasing portion 3*a*, toward the rotating plate 3*b*. Namely, for example, the carrying mechanism 10*b* can be conducted in a variety of forms, such as a configuration in which the carrying mechanism 10*b* carries the dice 70 by air pressure from the housing portion 10*a* toward the dice releasing portion 3*a*, and a configuration in which the carrying mechanism 10*b* carries the dice 70 by a conveyor-like carrier from the housing portion 10*a* toward the dice releasing portion 3*a*.

The gaming portion 3 is covered at its whole upper portion by a hemispheric covering member 12 made of transparent acrylic, and therefore the rotating range of the dice 70 is regulated. In the present embodiment, the outcome detecting device 15 that detects the outcomes of the dice 70 is installed on the top of the covering member 12. It is to be noted that in FIG. 2, the covering member 12 is drawn so as to cover only part of the gaming portion 3 for the sake of facilitating the description.

Figure 5:
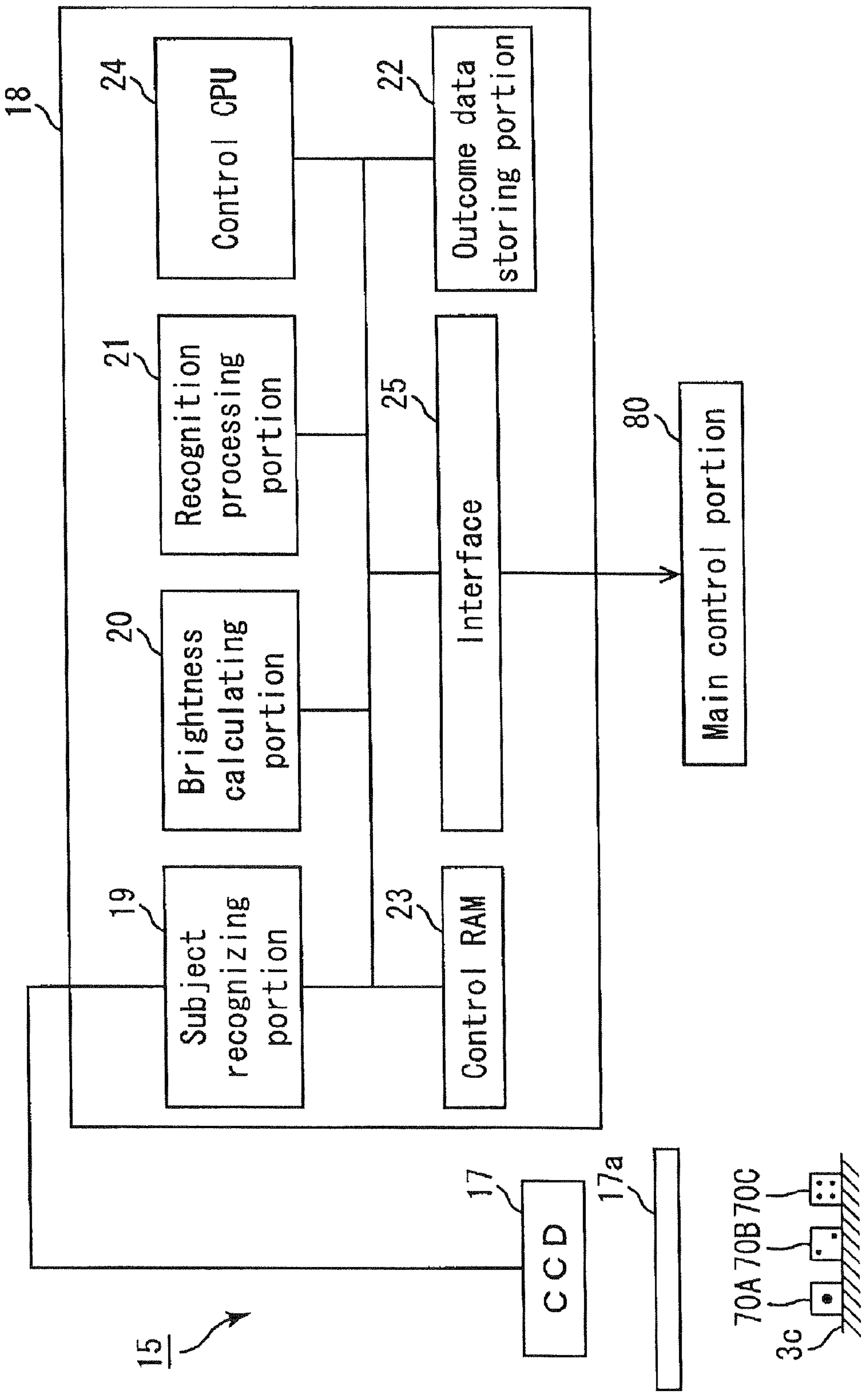
FIG. 5 is a block diagram showing an internal configuration of an outcome detecting device in the gaming machine shown in FIG. 2.

FIG. 5 is a block diagram showing an internal configuration of the outcome detecting device in the gaming machine shown in FIG. 2.

The outcome detecting device 15 in the present embodiment includes an imaging device (CCD camera) 17 that photographs the dice 70 being the object to be photographed, and an outcome detecting circuit 18 that processes the imaging signal from the imaging device 17 and then detects the outcomes of the dice 70.

The imaging device 17 is previously made by a focus lens 17*a* to have a focus consistent with the stopping plate 3*c* in order to photograph the dice 70 on the stopping plate 3*c*, and is exposure-controlled. The outcome detecting circuit 18 includes: a subject recognizing portion 19 that receives an imaging signal from the imaging device 17 to recognize a position of a subject (dice 70); a brightness calculating portion 20 that calculates brightness of the image of the subject (image of the dice) recognized in the subject recognizing portion 19; a recognition processing portion 21 that identifies the outcomes of the dice 70; an outcome data storing portion 22 in which comparison data regarding the outcomes of the dice 70 is stored; a control RAM 23; and a control CPU 24 that controls these units. These units are connected to one another through a bus, and controlled by the control CPU 24.

From the imaging signal of the dice 70 received from the imaging device 17, intensity distribution of the image is measured in the subject recognizing portion 19. Measuring the intensity distribution allows identification of the positions of the dice 70 on the stopping plate 3*c* and the surface states of the dice 70. In the recognition processing portion 21, the identified data is subjected to processing of comparison with the comparison data previously stored in the outcome data storing portion 22, to identify the outcomes of the dice 70.

The identified outcome information is stored into the control RAM 23, and transmitted to a later-described main control portion 80 through an interface 25. Namely, the outcome detecting device 15 identifies the outcomes of the three dice 70 having stopped in the gaming portion 3, and transmits the identified outcome information to the main control portion 80.

Figure 6:
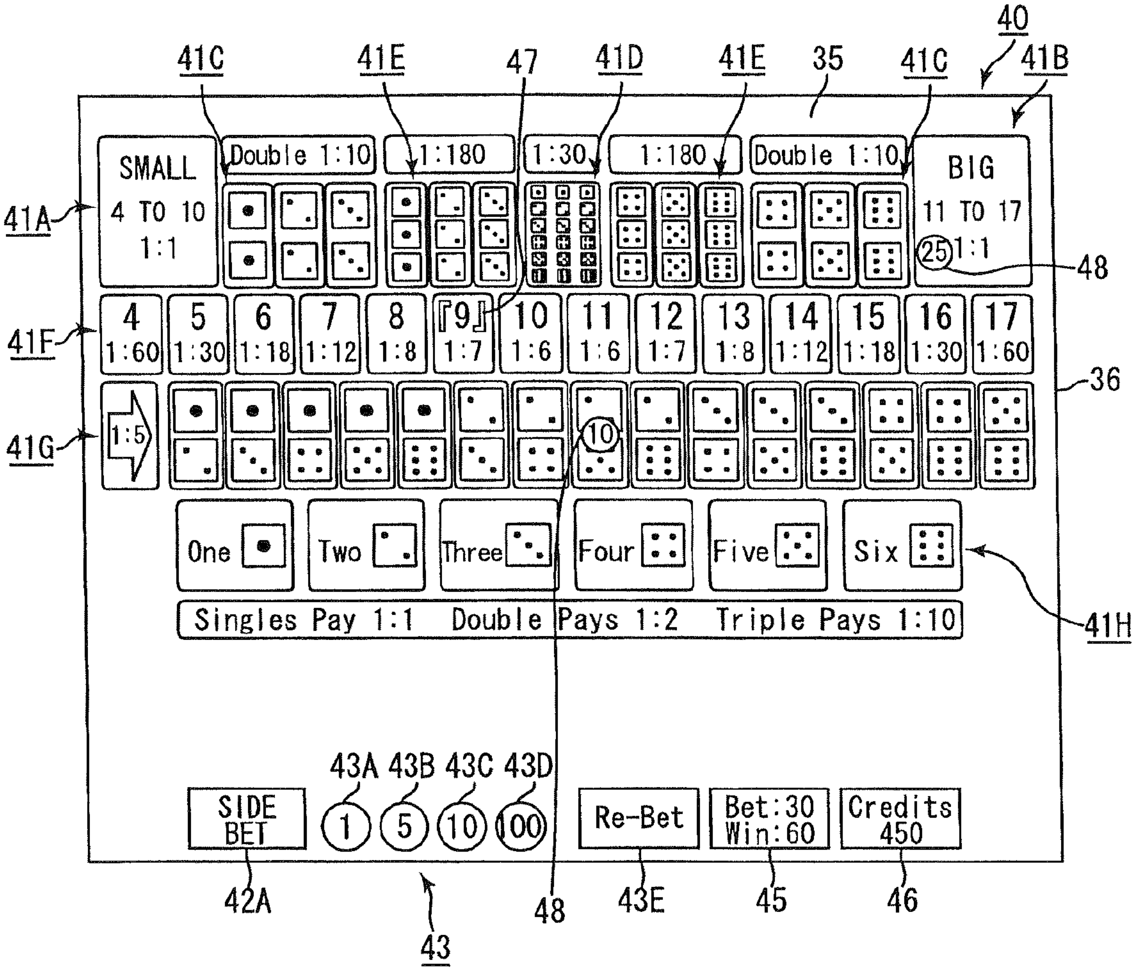
FIG. 6 is an exemplary view showing a display screen displayed to the image display.

FIG. 6 is an exemplary view showing the display screen displayed to the image display.

As shown in FIG. 6, the image display 7 is a touch-panel-type liquid crystal display having a touch panel 35 installed on its front surface; the player can select an icon and the like displayed to the liquid crystal screen 36 by touching the touch panel 35 with his/her finger or the like.

During the game, a table-type betting board (normal BET screen) 40 with which the player can place a BET on the outcomes of the three dice 70 which stop in one game is displayed to the image display 7 at a predetermined timing.

The following describes the normal BET screen 40 in more detail.

On the normal BET screen 40, a plurality of BET areas 41 (BET area 41A, BET area 41B, BET area 41C, BET area 41D, BET area 41E, BET area 41F, BET area 41G, BET area 41H) are displayed. A normal BET operation is performed by touching the touch panel 35 with a finger or the like to specify the BET area 41, and making chips displayed on the specified BET area 41.

In the lower portion of the normal BET screen 40, there are displayed a side BET switching button 42A, a unit BET button 43, a Re-BET button 43E, a payback result display portion 45, and a number-of-credits display portion 46 in order from the left. The side BET switching button 42A is to be selected when the player wishes to place the side BET. Namely, touching the side BET switching button 42A with the finger or the like switches the screen from the normal BET screen 40 to the side BET screen 60, so that the side BET can be placed.

The unit BET button 43 is used for betting a chip on the BET area 41 specified by the player. The unit BET button 43 is configured by four types of buttons: a 1-BET button 43A; a 5-BET button 43B; a 10-BET button 43C; and a 100-BET button 43D. It is to be noted that, when the BET operation is wrongly performed, it can be performed again by touching a Re-BET button 43E with the finger or the like.

The player first touches the touch panel 35 with the finger or the like to specify the BET area 41 by using a cursor 47. At this state, touching the 1-BET button 43A with the finger or the like enables the player to BET one chip at a time (the number of BETs increases in order of 1, 2, 3, and so forth every time the 1-BET button 43A is touched with the finger or the like). Similarly, touching the 5-BET button 43B with the finger or the like enables the player to BET five chips at a time (the number of BETs increases in order of 5, 10, 15, and so forth every time the 5-BET button 43B is touched with the finger or the like). Touching the 10-BET button 43C with the finger or the like enables the player to BET ten chips at a time (the number of BETs increases in order of 10, 20, 30, and so forth every time the 10-BET button 43C is touched with the finger or the like). Touching the 100-BET button 43D with the finger or the like enables the player to BET one hundred chips at a time (the number of BETs increases in order of 100, 200, 300, and so forth every time the 100-BET button 43D is touched with the finger or the like). To the BET area 41, the number of BET chips up to the present moment is displayed as a chip mark 48, and a number displayed within the chip mark 48 shows the number of BETs of chips.

In a payback result display portion 45, the number of BETs of chips of the player and the number of payback credits in the previous game are displayed. A number obtained by subtracting the number of BETs from the number of payback credits indicates the number of credits newly acquired by the player in the previous game.

In the number-of-credits display portion 46, the number of credits owned by the player is displayed. This number of credits decreases according to the number of BETs (one credit per one chip) when chips are BET. Further, when the BET chips are won and credits are paid back, the number of credits increases by the number of the paid back credits. It is to be noted that, when the number of credits becomes 0, the game is ended.

Next, the BET areas 41 on the normal BET screen 40 are described.

The BET areas 41A, 41B are portions used when the player places a BET based on a prediction of the total value of the dice 70A to 70C. Namely, the BET area 41A is selected when the total value is predicted to be 4 to 10, and the BET area 41B is selected when the total value is predicted to be 11 to 17. The payout is set to 1:1 (two chips are paid out with respect to one BET).

The BET area 41C is a portion used when the player places a BET based on a prediction that the outcomes of two dice 70 out of the three dice 70 will be the same. Namely, the BET area 41C is used when the player places a BET based on a prediction that any of the combinations of the outcomes (1, 1), (2, 2), (3, 3), (4, 4), (5, 5) and (6, 6) will appear, out of the outcomes of the three dice 70; here, the payout is set to 1:10.

The BET area 41D is a portion used when the player places a BET based on a prediction that all of the outcomes of the three dice 70 will be the same. Namely, the BET area 41D is used when the player places a BET based on a prediction that the outcomes of the three dice 70 will be any of (1, 1, 1), (2, 2, 2), (3, 3, 3), (4, 4, 4), (5, 5, 5) and (6, 6, 6). The payout is set to 1:30.

The BET area 41E is a portion used when the player places a BET based on a prediction that all of the outcomes of the three dice 70 will be the same, and a prediction of the value that the three dice 70 will have. Namely, the BET area 41E is used when the player places a BET based on a prediction that the outcomes of the three dice 70 will be (1, 1, 1), (2, 2, 2), (3, 3, 3), (4, 4, 4), (5, 5, 5) or (6, 6, 6) and also a prediction of the value that the three dice 70 will have. The payout is set to 1:180.

The BET area 41F is a portion used when the player places a BET based on a prediction of the total value of the three dice 70. The payout is set according to an appearance probability of the total value: the payout is 1:60 when the total value is 4 or 17; 1:30 when the total value is 5 or 16; 1:18 when the total value is 6 or 15; 1:12 when the total value is 7 or 14; 1:8 when the total value is 8 or 13; 1:7 when the total value is 9 or 12; and 1:6 when the total value is 10 or 11.

The BET area 41 G is a portion used when the player places a BET based on a prediction of the outcomes of two dice 70 out of the three dice 70. The payout is set to 1:5.

The BET area 41H is a portion used when the player places a BET based on a prediction of the outcome of at least one die 70 out of the dice 70; the payout is set according to the number of the dice 70 with the outcome corresponding to the predicted outcome.

FIG. 1 is an exemplary view showing the display screen displayed to the image display.

The side BET screen 60 is displayed by touching the side BET switching button 42A on the normal BET screen 40 with the finger or the like. It is to be noted that, among display portions forming this side BET screen 60, the display portions having the same functions as those on the normal BET screen 40 are provided with the same numerals as on the normal BET screen 40, and detailed descriptions thereof are omitted.

The side BET screen 60 is for placing the side BET on the order of whether the total value of the outcomes of the dice 70 in each game of three games is even or odd.

A BET area 241A is displayed to the side BET screen 60, and the player performs a BET operation by touching the touch panel 35 with the finger or the like to specify the BET area 241A and making chips displayed to the specified BET area 241A.

The BET area 241A is a portion used when the player places the BET on the order of whether the total value of the outcomes of the dice 70 in each game of three games is even or odd. The payout is set to 1:8.

In the lower portion of the side BET screen 60, a normal BET switching button 42B is displayed. Touching the normal BET switching button 42B with the finger or the like switches the screen from the side BET screen 60 to the normal BET screen 40, so that the normal BET can be placed.

Figure 7:
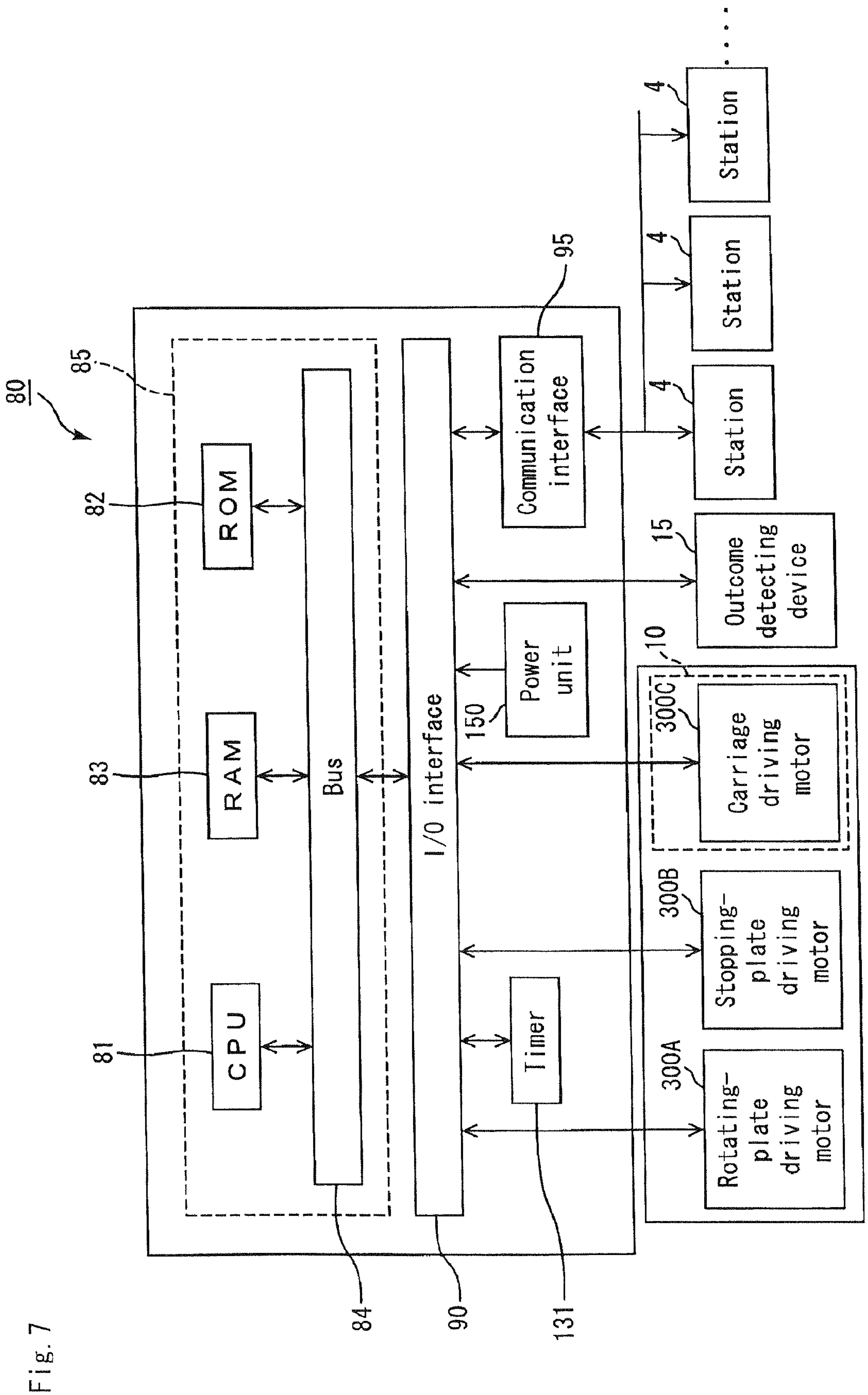
FIG. 7 is a block diagram showing an internal configuration of the gaming machine shown in FIG. 2.

FIG. 7 is a block diagram showing an internal configuration of the gaming machine shown in FIG. 2.

The main control portion 80 of the gaming machine 1 has a microcomputer 85, which mainly comprises a CPU 81, a ROM 82, a RAM 83, and a bus 84 that transfers data mutually thereamong.

The CPU 81 is connected to the rotating-plate driving motor 300A, the stopping-plate driving motor 300B and the carriage driving motor 300C, through an I/O interface 90. Further, through the I/O interface 90, the CPU 81 is connected to a timer 131 capable of measuring time. The I/O interface 90 is also connected with the foregoing outcome detecting device 15, and transmits and receives information on the outcomes of the three dice 70 having stopped on the stopping plate 3*c*, and the like, to and from the outcome detecting device 15. Moreover, the I/O interface 90 is connected with a communication interface 95; through this communication interface 95, the main control portion 80 transmits and receives data such as normal BET information, side BET information, payout information, a BET start signal, and a BET end signal, to and from each station 4. It is to be noted that, hereinafter, BET information described refers to both normal BET information and side BET information. Further, the side BET information includes side BET even-odd information inputted by the player, which shows the appearance order of even or odd values.

Moreover, the I/O interface 90 is connected with a power unit 150. When power is supplied from the power unit 150, the CPU 81 of the main control portion 80 is activated, and simultaneously, the power is supplied to each station 4 through the communication interface 95, and the CPU 111 of each station 4 is activated.

The ROM 82 of the main control portion 80 stores programs (dice game programs) for realizing a basic function of the gaming machine 1, specifically a program for controlling a variety of devices for driving the gaming portion 3, a program for controlling each station 4, and the like, and also stores a payout table, data showing predetermined time T, data showing a specific value TT, and the like.

Further, the ROM 82 stores a program such as BIOS (Basic Input/Output System) that is executed by the CPU 81, and an authentication program. When the BIOS is executed by the CPU 81, not only is initialization processing for predetermined peripheral devices conducted, but processing of fetching a dice game program is also started. The authentication program is a program for authenticating the dice game programs, and is described along procedures (authentication procedures) for authenticating the dice game programs.

The RAM 83 is a memory that temporarily stores a variety of data calculated in the CPU 81. For example, the RAM 83 temporarily stores: a game number Y; normal BET information and side BET information including side BET even-odd information therein transmitted from each station 4; information on the outcomes of the dice 70 transmitted from the outcome detecting device 15; the total value of the outcomes of the dice 70; the even-odd information showing an even or odd value; a side-BET accepted flag; a side-BET winning flag; data on results of processing executed by the CPU 81; and the like.

Based on the data and programs stored in the ROM 82 and the RAM 83, the CPU 81 controls the rotating-plate driving motor 300A, the stopping-plate driving motor 300B and the carriage driving motor 300C which drive the gaming portion 3, throws the dice 70 onto the rotating plate 3*b* of the gaming portion 3, and performs some other operations. Further, the CPU 81 executes control processing associated with the proceeding of the game, such as processing of checking the outcome of each of the dice 70 having stopped on the stopping plate 3*c*.

In addition to the control processing associated with the proceeding of the game, the CPU 81 has the function of controlling each station 4 so as to make the game proceed, by transmitting and receiving data to and from each station 4. Specifically, the CPU 81 receives normal BET information and side BET information transmitted from each station 4 and stores it in the RAM 83. Further, based on the outcomes of the dice 70 stored in the RAM 83 and the normal BET information and the side BET information stored in the RAM 83, the CPU 81 performs winning determination processing, to calculate a payout value to be paid out at each station 4 with reference to the payout table stored in the ROM 82.

Figure 8:
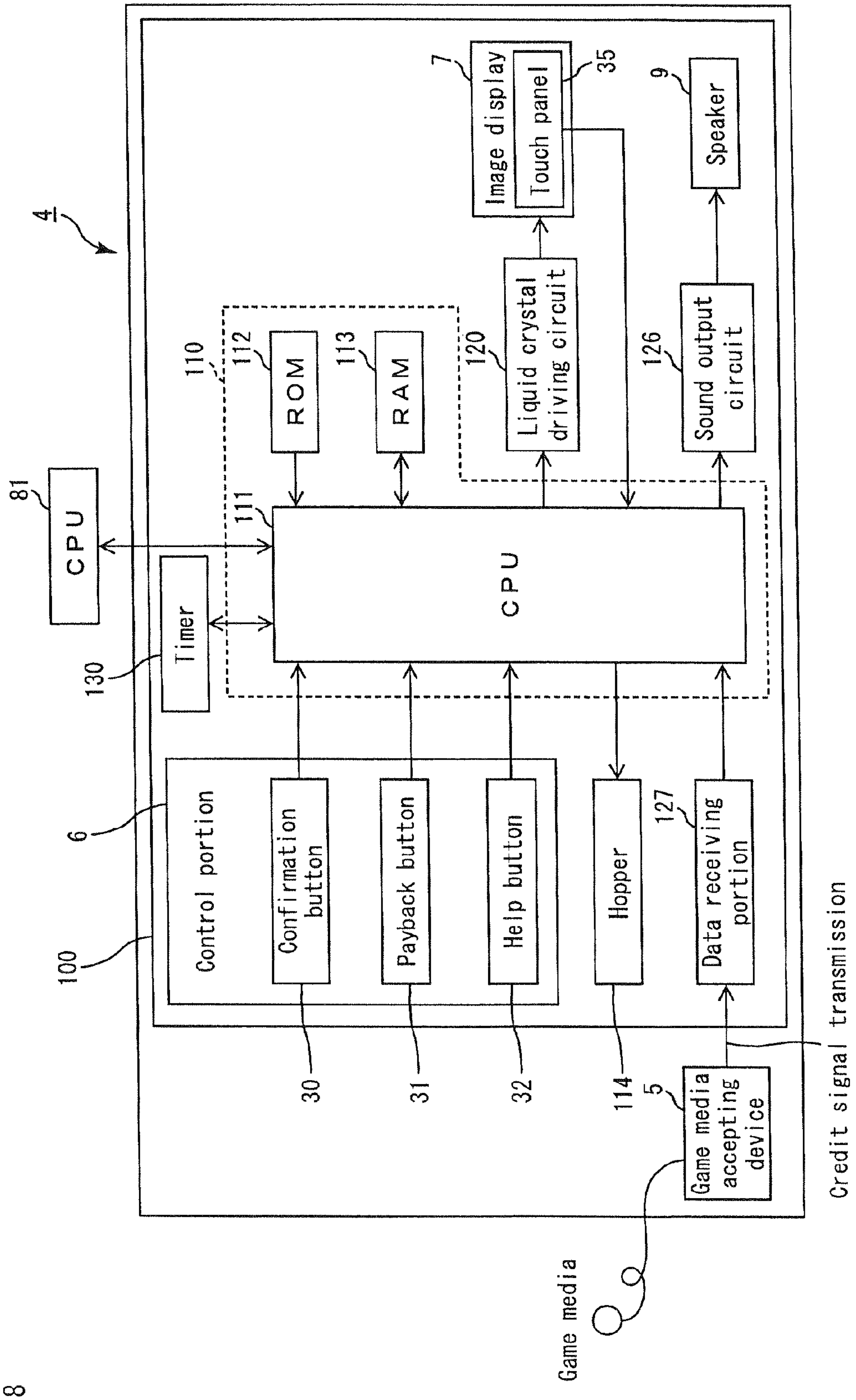
FIG. 8 is a block diagram showing an internal configuration of one of the stations shown in FIG. 2.

FIG. 8 is a block diagram showing an internal configuration of the station shown in FIG. 2.

The station 4 includes a body portion 100 provided with the image display 7 and the like, and the game media accepting device 5 installed on the body portion 100. Further, the body portion 100 includes a station-controlling portion 110 and several peripheral devices.

The station-controlling portion 110 includes a CPU 111, a ROM 112, and a RAM 113.

The ROM 112 stores a program for realizing a basic function of the station 4, a variety of programs necessary for controlling the station 4, a data table, and the like.

Further, the ROM 112 stores a program such as BIOS (Basic Input/Output System) executed by the CPU 111. When BIOS is executed by the CPU 111, initialization processing for predetermined peripheral devices is conducted.

The RAM 113 is a memory that temporarily stores a variety of data calculated in the CPU 111, the number of credits owned by the player, the state of BETs placed by the player, and the like.

The CPU 111 is connected separately with the confirmation button 30, the payback button 31, and the help button 32 which are provided in the control portion 6. Further, based on an operation signal output at the press of each button or the like, the CPU 111 performs control so as to execute a variety of operations corresponding to the signal. Specifically, the CPU 111 executes a variety of processing, based on an input signal that is supplied from the control portion 6 when the player has input an operation and on the data and programs stored in the ROM 112 and the RAM 113, and transmits the results of the processing to the CPU 81 of the main control portion 80.

Further, the CPU 111 receives a command signal from the CPU 81 of the main control portion 80, to control the peripheral devices constituting the station 4. Moreover, the CPU 111 executes a variety of processing, based on input signals supplied from the control portion 6 and the touch panel 35 and on the data and programs stored in the ROM 112 and the RAM 113. Based on the results of the processing, the CPU 111 controls the peripheral devices constituting the station 4. It is to be noted that which method is to be applied in performing the processing is set for each processing according to the content of the processing. For example, the processing of paying out game media corresponds to the former, and the BET operation processing by the player corresponds to the latter.

The CPU 111 is connected with a hopper 114, and the hopper 114 pays out a predetermined number of game media from the payout exit 8 based on a command signal from the CPU 111.

The CPU 111 is connected with the image display 7 through a liquid crystal driving circuit 120. The liquid crystal driving circuit 120 includes a program ROM, an image ROM, an image control CPU, a work RAM, a VDP (video display processor), a video RAM, and the like. The program ROM stores an image control program regarding display to the image display 7 and a variety of selection tables. The image ROM stores, for example, dot data for forming an image displayed to the image display 7. Further, based on parameters set in the CPU 111, the image control CPU determines an image to be displayed to the image display 7 out of the dot data previously stored inside the image ROM, according to the image control program previously stored inside the program ROM. Moreover, the work RAM is configured as a temporary storage device in execution of the image control program in the image control CPU. Further, the VDP forms an image according to the display contents determined by the image control CPU, and outputs the image to the image display 7. It is to be noted that the video RAM is configured as a temporary storage device in formation of an image by the VDP.

The touch panel 35 is installed on the front surface of the image display 7, as described above, and information on the operation of the touch panel 35 is transmitted to the CPU 111. The touch panel 35 detects an input operation performed by the player on the normal BET screen 40, the side BET screen 60, and the like. Specifically, selection of the BET areas 41 of the normal BET screen 40 and the BET areas 241 of the side BET screen 60, input using the unit BET buttons 43 and the like are performed by the operation of touching the touch panel 35, and the information of the operation is transmitted to the CPU 111. Based on the information, BET information of the player is stored in the RAM 113. Further, the BET information is transmitted to the CPU 81 of the main control portion 80, and stored in the BET information storage area in the RAM 83.

Further, the sound output circuit 126 and the speakers 9 are connected to the CPU 111, and the speakers 9 generate a variety of effect sounds when a variety of effects are produced based on output signals from the sound output circuit 126. Moreover, the CPU 111 is connected with the game media accepting device 5 functioning as a device into which game media such as medals or currency are inserted through a data receiving portion 127. The data receiving portion 127 receives a credit signal transmitted from the game media accepting device 5, and the CPU 111 increases the number of credits of the player stored in the RAM 113 based on the transmitted credit signal.

Subsequently, processing executed in the gaming machine according to the present embodiment will be described by using FIG. 9 to FIG. 12.

Figure 9:
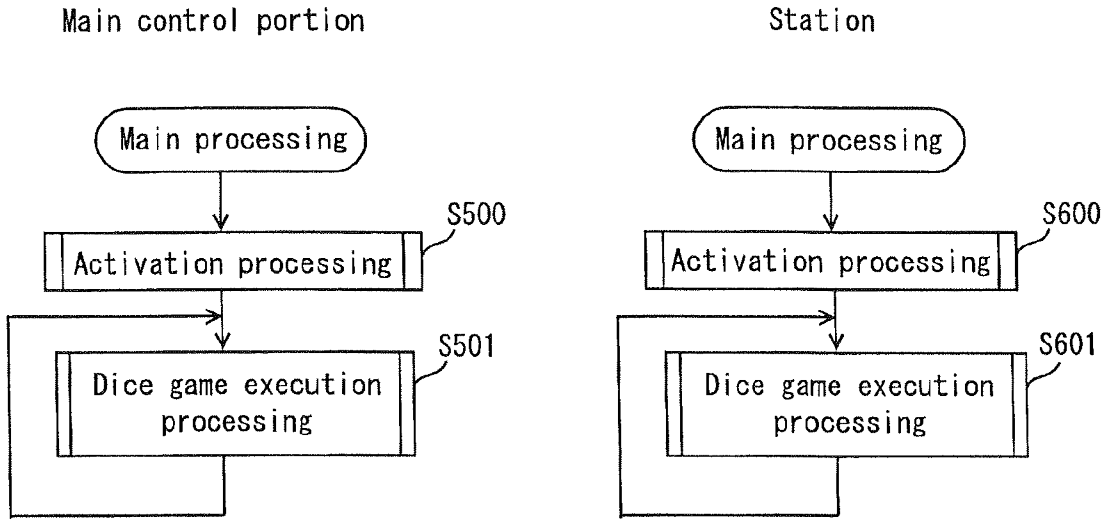
FIG. 9 is a flowchart showing main processing according to the present embodiment.
Figure 10A:
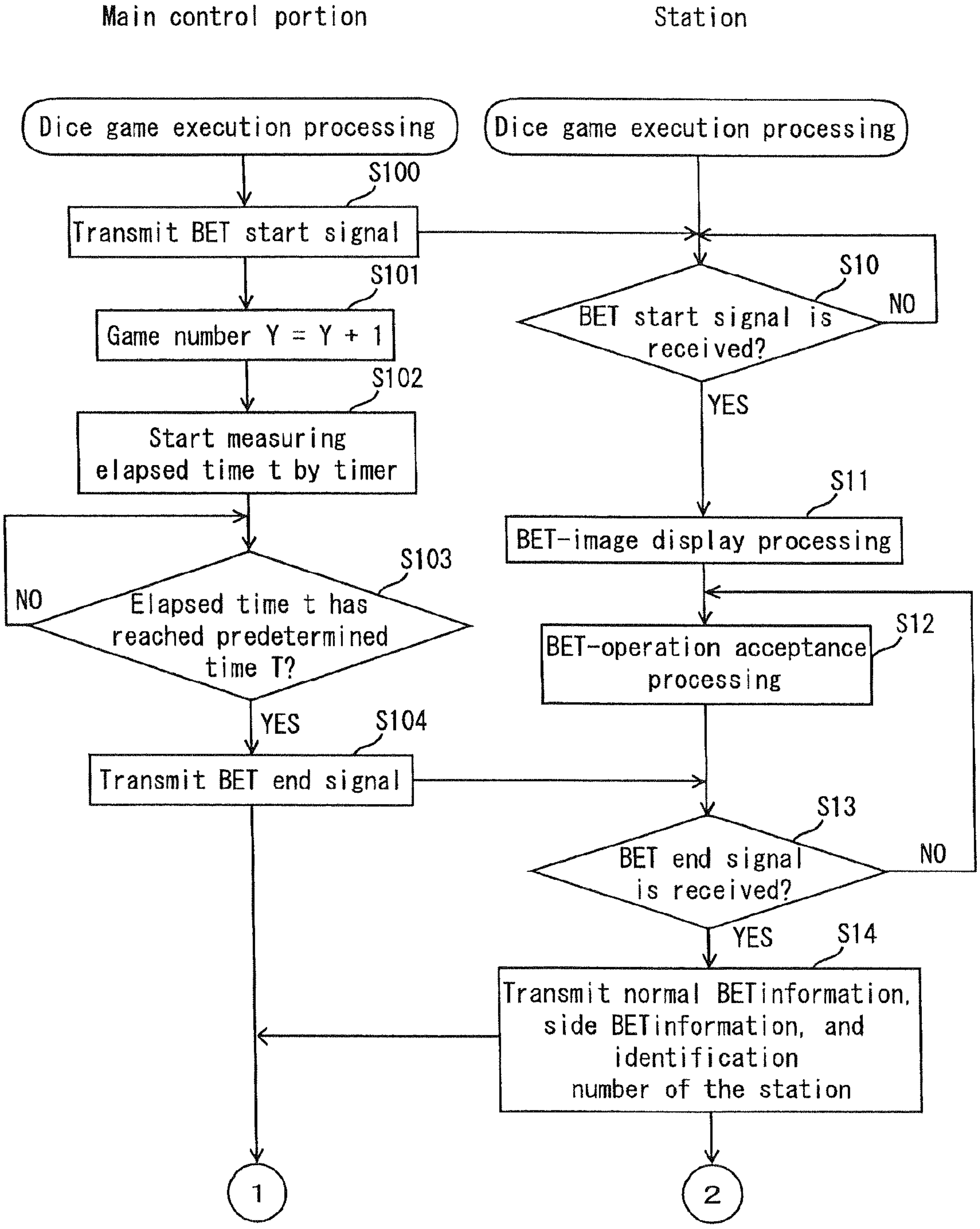
FIG. 10A is a flowchart showing a subroutine of dice game execution processing according to the present embodiment.
Figure 10B:
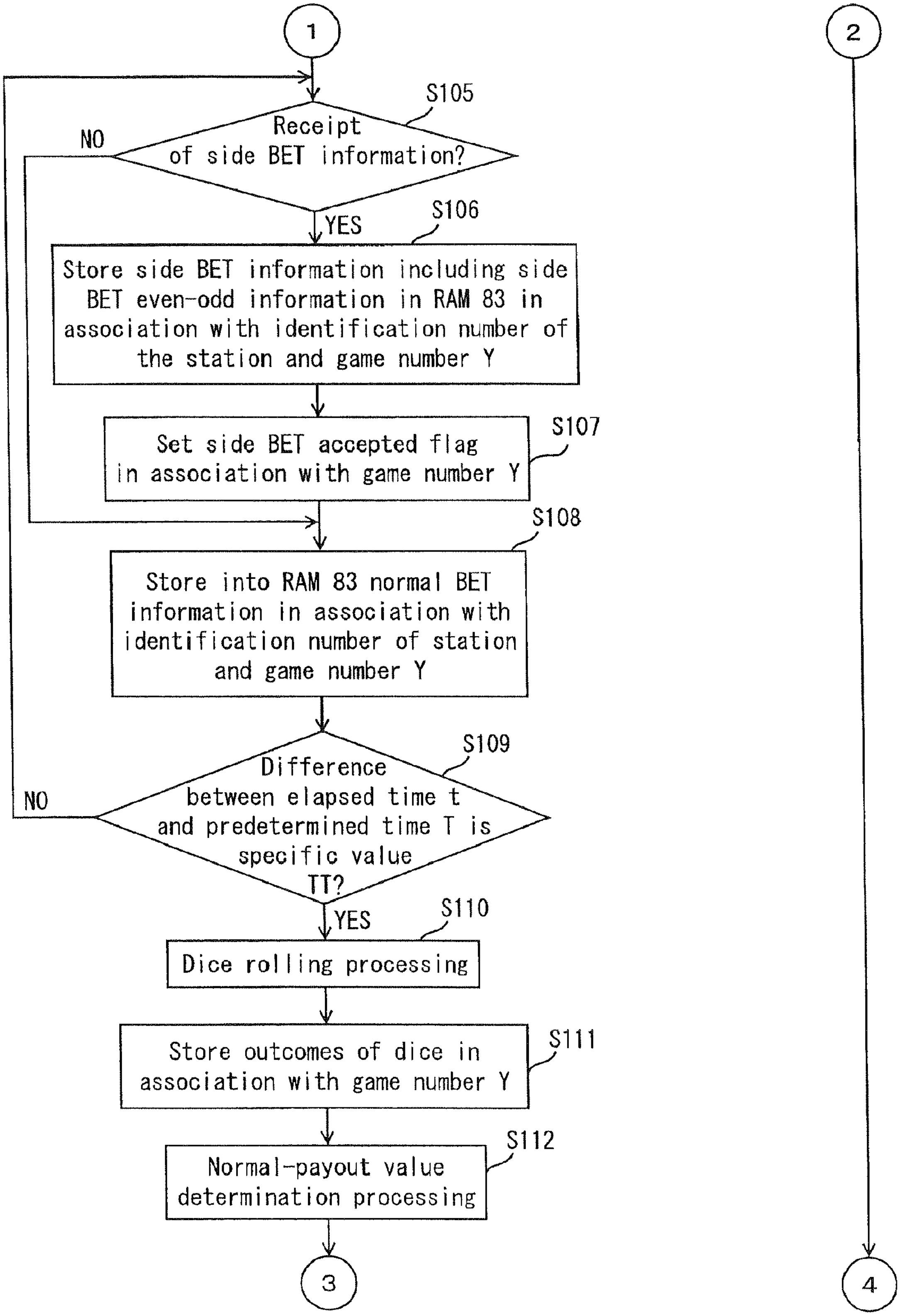
FIG. 10B is a flowchart showing a subroutine of the dice game execution processing according to the present embodiment.
Figure 10C:
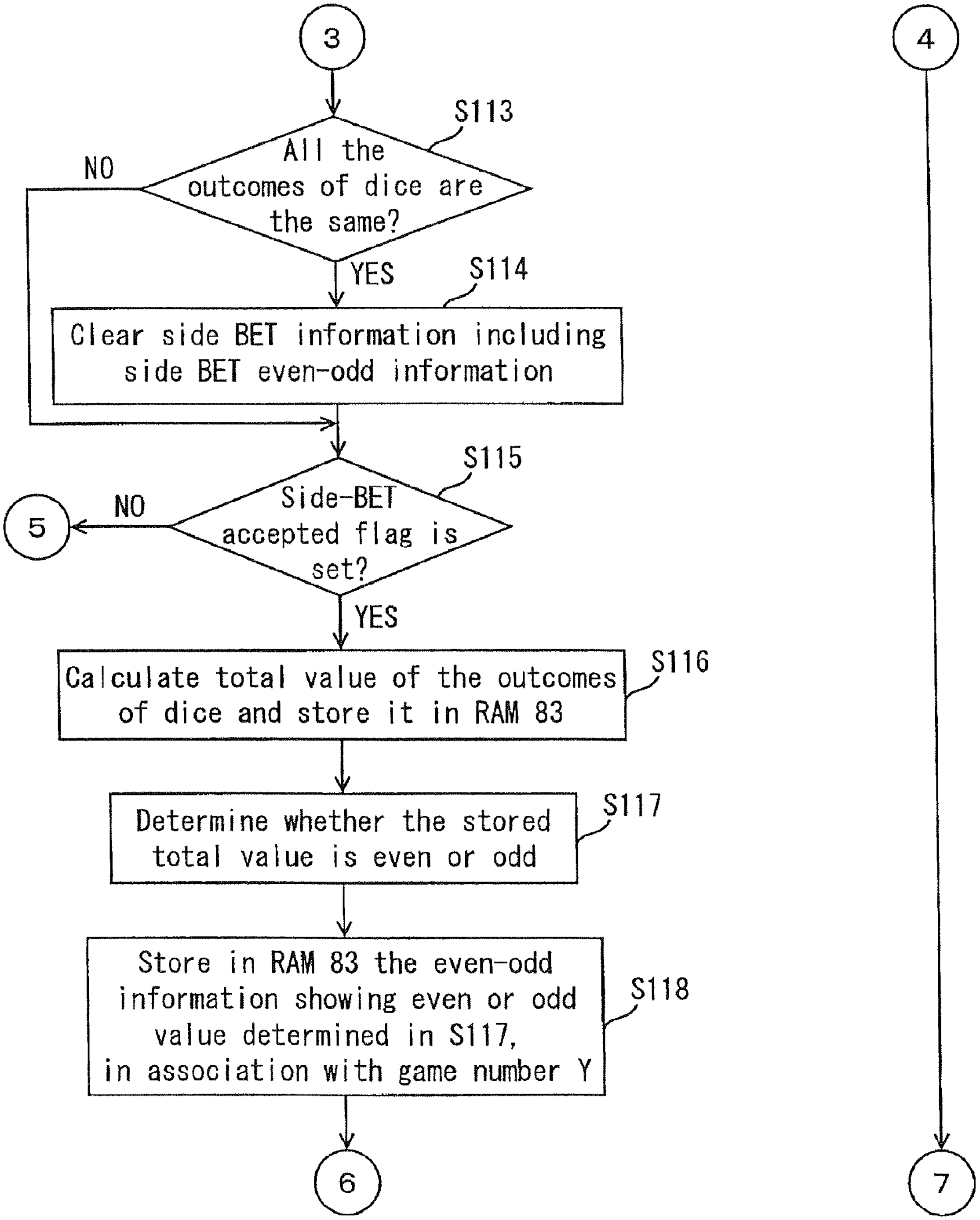
FIG. 10C is a flowchart showing a subroutine of the dice game execution processing according to the present embodiment.
Figure 10D:
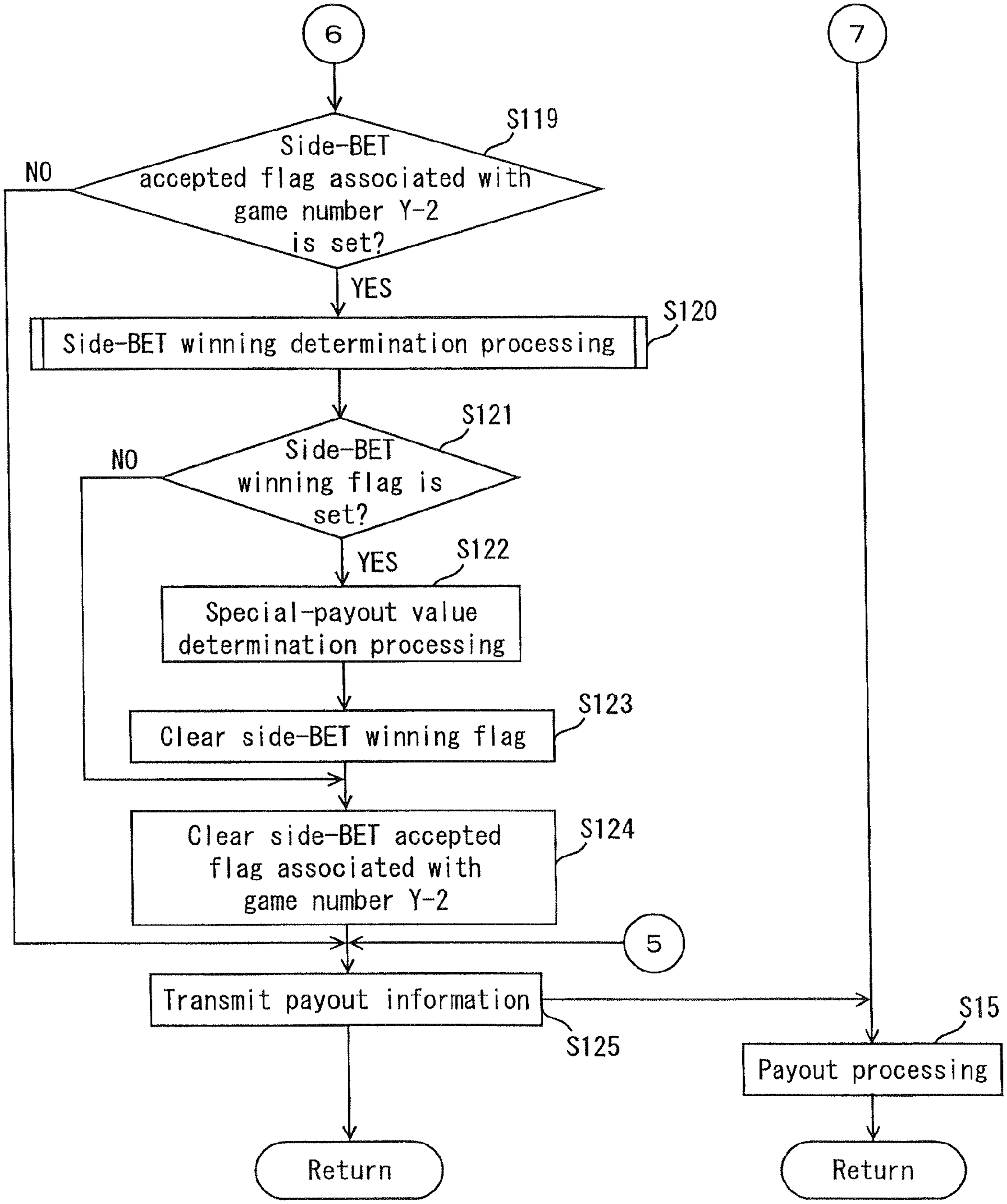
FIG. 10D is a flowchart showing a subroutine of the dice game execution processing according to the present embodiment.

FIG. 9 is a flowchart showing the main processing according to the present embodiment.

In the main control portion 80, the following main processing is performed.

The CPU 81 of the main control portion 80 executes activation processing (step S500). The activation processing performed in step S500 will be described later using FIG. 12. After executing the activation processing, the CPU 81 executes dice game execution processing (step S501). The dice game execution processing performed in step S501 will be described later using FIG. 10A to FIG. 10D. Meanwhile, the following main processing is performed in the station 4.

The CPU 111 of the station 4 executes activation processing (step S600). The activation processing performed in step S600 will be described later using FIG. 12. After executing the activation processing, the CPU 111 executes dice game execution processing (step S601). The dice game execution processing performed in step S601 will be described later using FIG. 10A to FIG. 10D.

FIG. 10A to FIG. 10D are flowcharts showing a subroutine of the dice game execution processing according to the present embodiment.

It is to be noted that only processing in one of the stations 4 is illustrated in FIG. 10A to FIG. 10D in order to avoid complexity.

The main control portion 80 performs operations of steps S110 to S125.

First, in step S100, the CPU 81 transmits a BET start signal to each station 4.

In step S101, the CPU 81 adds 1 to the game number Y stored in the RAM 83, and stores the resulting value as a new game number Y into the RAM 83.

In step S102, the CPU 81 starts measurement of elapsed time t by using the timer 131. Next, the CPU 81 compares the elapsed time t measured by the timer 131 with data indicating predetermined time T stored in the ROM 82, and then determines whether or not the elapsed time t measured by the timer 131 has reached the predetermined time T (step S103).

When determining in step S103 that the elapsed time t has not reached the predetermined time T, the CPU 81 returns the processing to step S103. On the other hand, when determining in step S103 that the elapsed time t has reached the predetermined time T, the CPU 81 transmits a BET end signal to each station 4 (step S104).

In step S105, the CPU 81 determines whether or not to have received the side BET information from each station 4. When determining in step S105 that the side BET information has not been received, the CPU 81 shifts the processing to step S108. On the other hand, when determining in step S105 that the side BET information has been received, the CPU 81 shifts the processing to step S106.

In step S106, the CPU 81 stores into the RAM 83 the side BET information including side BET even-odd information therein received from each station 4, in association with the identification number of the station and a game number Y.

In step S107, the CPU 81 sets the side-BET accepted flag, in association with the game number Y.

When determining in step S105 that the side BET information has not been received, or when executing the processing of step S107, the CPU 81 stores into the RAM 83 the normal BET information received from each station 4, in association with the identification number of the station and the game number Y (step S108).

The CPU 81 determines whether or not the difference between the elapsed time t measured by the timer 131 and the predetermined time T stored in the ROM 82 has become a specific value TT stored in the ROM 82 (step S109). In the processing, the CPU 81 first subtracts the predetermined time T stored in the ROM 82 from the elapsed time t measured by the timer 131. The CPU 81 further compares the numeric value obtained by the subtraction with the specific value TT stored in the ROM 82, and determines whether or not the numeric value obtained by the subtraction has become the specific value TT stored in the ROM 82. By appropriately setting data showing the specific value TT, setting can be made such that processing of rolling the dice 70 can be performed at a desired timing.

When determining in step S109 that the difference between the elapsed time t and the predetermined time T has not become the specific value TT, the CPU 81 returns the processing to step S105. On the other hand, when determining in step S109 that the difference between the elapsed time t and the predetermined time T has become the specific value TT, the CPU 81 shifts the processing to step S110.

The CPU 81 executes processing of rolling the dice 70 in step S110. In the processing, based on the data and programs stored in the ROM 82 and the RAM 83, the CPU 81 controls the rotating-plate driving motor 300A, the stopping-plate driving motor 300B and the carriage driving motor 300C so as to perform control of throwing in the dice 70, control of rolling the dice 70, control of stopping the dice 70, and the like. Further, the CPU 81 executes control processing associated with the proceeding of the game, such as processing of checking the outcome of each of the dice 70 having stopped on the stopping plate 3*c* and the like.

The CPU 81 stores the outcomes of the respective dice 70 having stopped on the stopping plate 3*c* in step S110 into the RAM 83, in association with the game number Y (step S111).

In step S112, the CPU 81 executes normal-payout value determination processing. In the processing, the CPU 81 executes winning determination processing, based on the information on the outcomes of the respective dice 70 stored in the RAM 83 in association with the game number Y and on the normal BET information stored in the RAM 83 in association with the identification number of each station and the game number Y. The CPU 81 then calculates a normal payout value to be paid out at each station 4 with reference to the payout table stored in the ROM 82.

The CPU 81 determines in step S113 whether or not all the outcomes of the respective dice 70 stored in the RAM 83 in association with the game number Y are the same. When determining in step S113 that all the outcomes of the respective dice 70 are not the same, the CPU 81 shifts the processing to step S115. On the other hand, when determining in step S113 that all the outcomes of the respective dice 70 are the same, the CPU 81 shifts the processing to step S114.

In step S114, the CPU 81 deletes the side BET information including side BET even-odd information therein stored into the RAM 83, in association with a game number Y-2, a game number Y-1 and the game number Y.

In step S115, the CPU 81 determines whether or not the side-BET accepted flag is set. When determining in step S115 that the side-BET accepted flag is not set, the CPU 81 shifts the processing to step S125. On the other hand, when determining in step S115 that the side-BET accepted flag is set, the CPU 81 shifts the processing to step S116.

In step S116, the CPU 81 calculates the total value of the outcomes of the respective dice 70 stored in the RAM 83, in association with the game number Y, and stores the calculated total value into the RAM 83.

The CPU 81 determines whether the total value stored into the RAM 83 in step S116 is even or odd (step S117). In the processing, when the last digit of the total value stored into the RAM 83 in step S116 is 2, 4, 6, 8, or 0, the CPU 81 determines that the total value is even. On the other hand, when the last digit of the total value stored into the RAM 83 in step S116 is 1, 3, 5, 7, or 9, the CPU 81 determines that the total value is odd.

The CPU 81 stores the even-odd information showing the even value or odd value, which is the result of the determination in step S117, into the RAM 83, in association with the game number Y (step S118). In the processing, when determining in step S117 that the value is even, the CPU 81 stores the even-odd information showing an even value into the RAM 83, in association with the game number Y. On the other hand, when determining in step S117 that the value is odd, the CPU 81 stores into the RAM 83 the even-odd information showing an odd value, in association with the game number Y.

In step S119, the CPU 81 determines whether or not the side-BET accepted flag associated with the game number Y-2 has been set. When determining in step S119 that the side-BET accepted flag has not been set, the CPU 81 shifts the processing to step S125. On the other hand, when determining in step S119 that the side-BET accepted flag has been set, the CPU 81 shifts the processing to step S120.

In step S120, the CPU 81 performs side-BET winning determination processing.

In the processing, the CPU 81 determines whether or not the side BET has won, based on the side BET even-odd information included in the side BET information stored in the RAM 83 and on the even-odd information stored in the RAM 83. When determining that the side BET has won, the CPU 81 sets a side-BET winning flag, in association with the identification number of the station where winning has occurred. This side-BET winning determination processing is described in detail later using a drawing.

The CPU 81 determines in step S121 whether or not the side-BET winning flag has been set. The CPU 81 shifts the processing to step S124, when determining in step S121 that the side-BET winning flag has not been set. On the other hand, the CPU 81 shifts the processing to step S122, when determining in step S121 that the side-BET winning flag has been set.

In step S122, the CPU 81 executes special-payout value determination processing.

In this processing, with reference to the payout table stored in the ROM 82, the CPU 81 calculates a special payout value to be paid out at each station 4, based on the identification number of the station associated with the side-BET winning flag and on the side BET information stored in the RAM 83 in association with the game number Y-2.

The CPU 81 clears the side-BET winning flag in step S123.

In step S124, the CPU 81 clears the side-BET accepted flag associated with the game number Y-2.

In step S125, the CPU 81 transmits payout information to each station 4. In this processing, the CPU 81 transmits information on the normal payout value determined in step S112 to each station 4. Further, when executing the special-payout value determination processing in step S122, the CPU 81 transmits to each station 4 the information on the special payout value determined in step S122.

Meanwhile, each station 4 executes respective operations of steps S10 to S15.

First, in step S10, the CPU 111 determines whether or not a BET start signal has been received from the main control portion 80. When determining that the BET start signal has not been received, the CPU 111 returns the processing to step S10. On the other hand, when determining that the BET start signal has been received, the CPU 111 shifts the processing to step S11.

The CPU 111 executes BET-image display processing in step S11. In the processing, the CPU 111 displays the normal BET screen 40 shown in FIG. 6 to the image display 7.

The CPU 111 executes BET-operation acceptance processing in step S12. In the processing, the CPU 111 accepts a normal BET input by the player through the touch panel 35. Further, the CPU 111 displays the side BET screen 60 to the image display 7, according to the input operations by the player via the touch panel 35. Then, the CPU 111 accepts a side BET input.

Next, the CPU 111 determines whether or not a BET end signal has been received from the main control portion 80 (step S13). When determining that the BET end signal has not been received, the CPU 111 returns the processing to step S12. On the other hand, when determining that the BET end signal has been received, the CPU 111 shifts the processing to step S14.

The CPU 111 transmits the normal BET information and the side BET information to the main control portion 80 in step S14. In the processing, the CPU 111 transmits to the main control portion 80 information regarding the normal BET input, which has been accepted in step S12, as the normal BET information. Further, the CPU 111 transmits to the main control portion 80 information regarding the side BET input, the information having been accepted in step S12, as the side BET information. It is to be noted that the normal BET information and the side BET information include the identification number of the station 4. Further, the side BET information includes the side BET even-odd information showing the appearance order of even or odd values inputted by the player, which has been accepted in step S12.

In step S15, the CPU 111 performs payout processing. In this processing, the CPU 111 updates the number of credits of the player stored in the RAM 113, and also updates displays of a payout result display portion 45 and the number-of-credits display portion 46, based on the payout information received form the main control portion 80.

Figure 11:
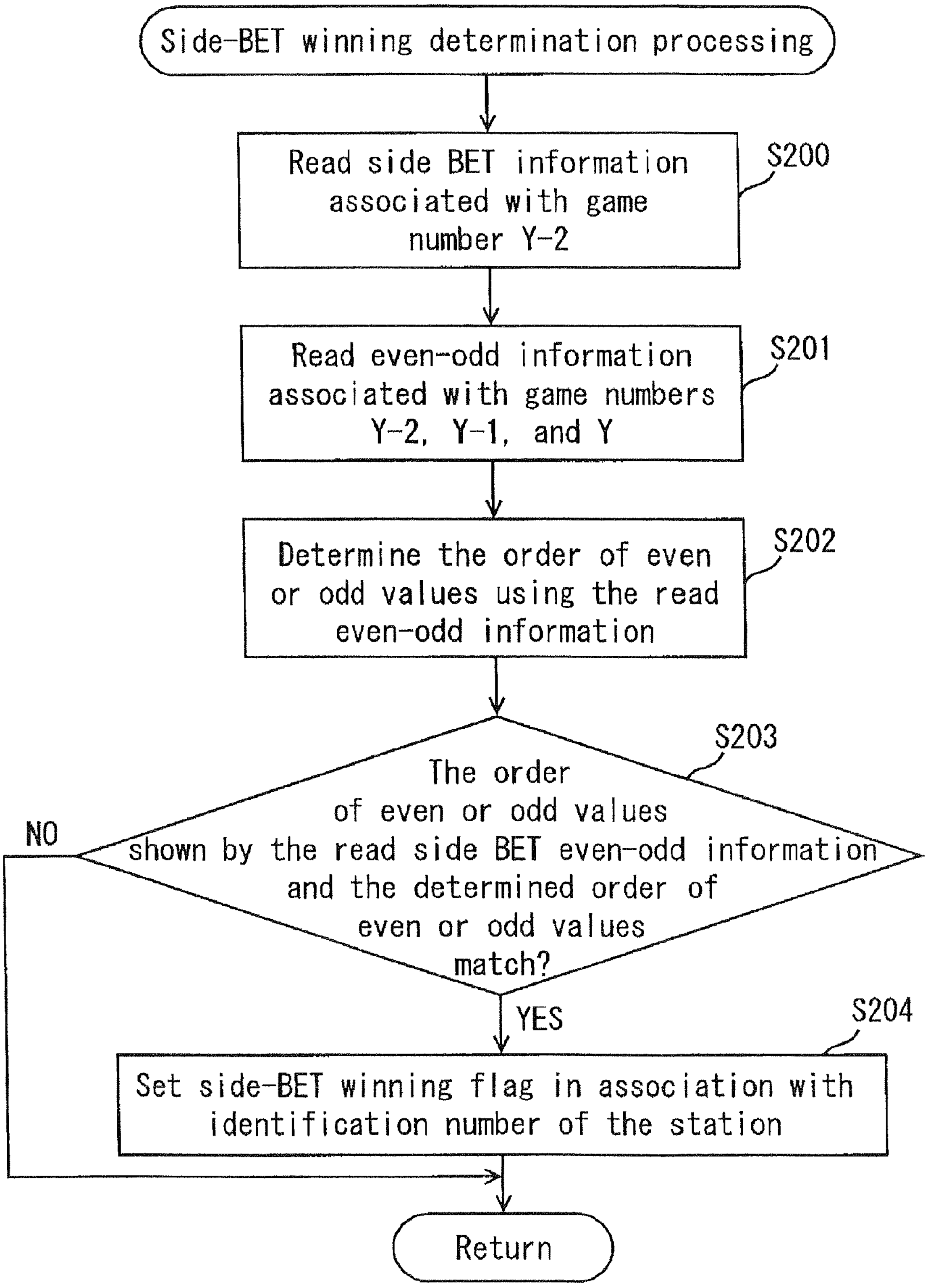
FIG. 11 is a flowchart showing side-BET winning determination processing according to the present embodiment.

FIG. 11 is a flowchart showing the side-BET winning determination processing according to the present embodiment.

First, in step S200, the CPU 81 reads side BET information stored in the RAM 83 in association with the game number Y-2. In a case that there are a plurality of pieces of side BET information, the CPU 81 executes the following processing of steps S201 to S204 for each piece of side BET information. It is to be noted that the read side BET information includes the side BET even-odd information.

In step S201, the CPU 81 reads the even-odd information stored in the RAM 83 in association with the game numbers Y-2, Y-1 and Y.

The CPU 81 determines the order of even or odd values based on the even-odd information read in step S201 (step S202).

The CPU 81 determines whether or not the order of even or odd values shown by the side BET even-odd information included in the side BET information read in step S200 matches the order of even or odd values determined in step S202 (step S203). When determining in step S203 that those orders do not match, the CPU 81 completes the present subroutine. On the other hand, when determining in step S203 that those orders match, the CPU 81 shifts the processing to step S204.

The CPU 81 sets the side-BET winning flag in association with the identification number of the station 4, which has been associated with the side BET information determined to match in step S203 (step S204).

Figure 12:
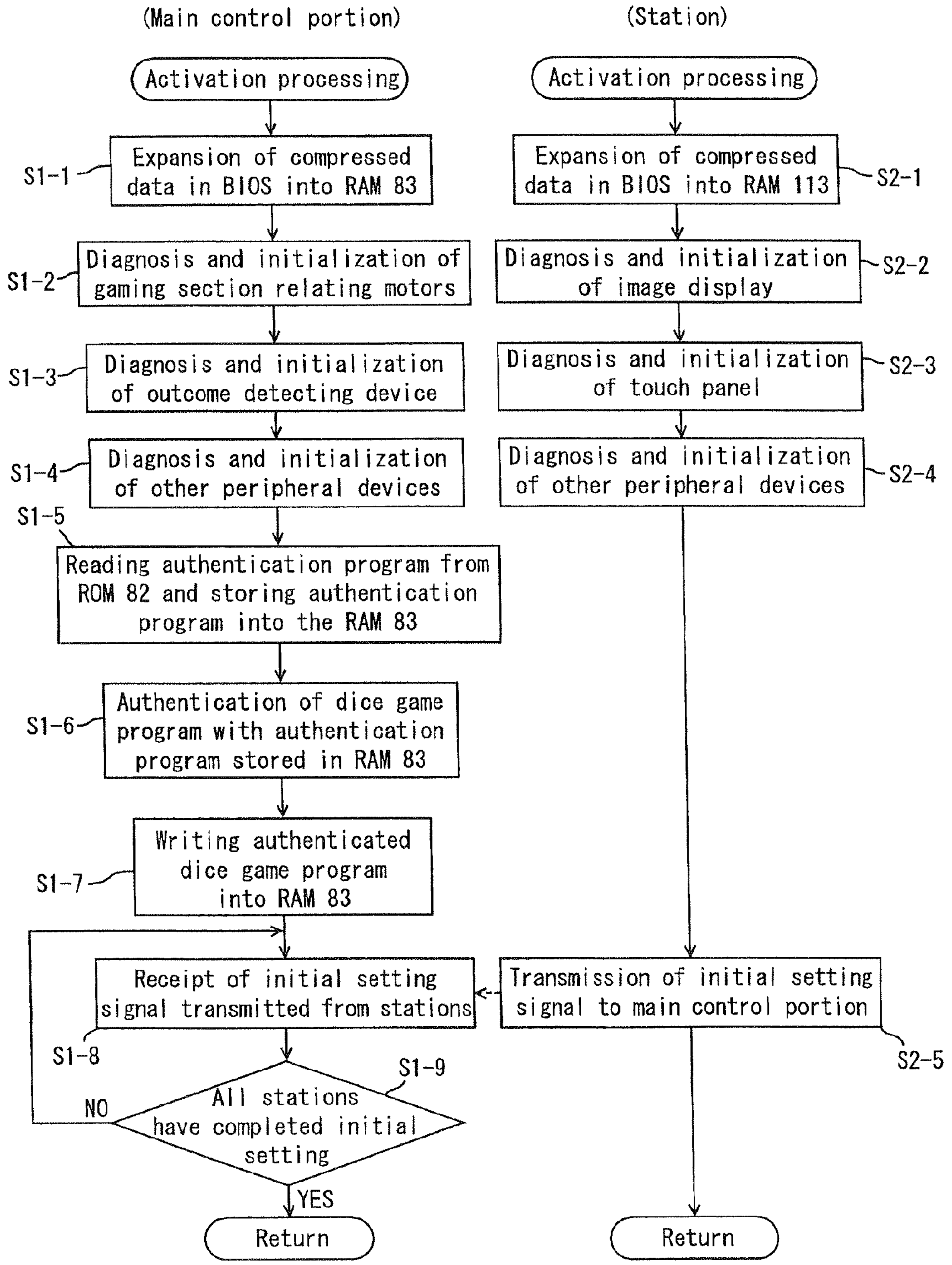
FIG. 12 is a flowchart showing a procedure of activation processing.

FIG. 12 is a flowchart showing procedures of activation processing.

This activation processing is processing performed in the main control portion 80 and the station 4 when the power switch is turned on (the power is turned on) in the power unit 150 (cf. step S500 and step S600 in FIG. 9).

When the power switch is turned on (the power is turned on) in the power unit 150, first, the CPU 81 of the main control portion 80 executes the BIOS stored in the ROM 82 and expands compressed data, which is incorporated in the BIOS, into the RAM 83 (step S1-1). The CPU 81 then executes the BIOS expanded into the RAM 83, to diagnose and initialize a variety of peripheral devices.

Specifically, the CPU 81 diagnoses and initializes the gaming portion relating motors (rotating-plate driving motor 300A, stopping-plate driving motor 300B, carriage driving motor 300C) (step S1-2). In this processing, the CPU 81 sequentially transmits request signals to a rotating-plate driving circuit that controls the rotating-plate driving motor 300A, a stopping-plate driving circuit that controls the stopping-plate driving motor 300B, and a carriage driving circuit that controls the carriage driving motor 300C, and determines whether or not to have received predetermined response signals, and also performs clearance of a predetermined storage area, and the like.

Next, the CPU 81 diagnoses and initializes the outcome detecting device 15 (step S1-3). In this processing, the CPU 81 transmits a request signal to an outcome detecting circuit that controls the outcome detecting device 15, and determines whether or not to have received a predetermined response signal, and also performs clearance of a predetermined storage area, and the like.

Next, the CPU 81 diagnoses and initializes the other peripheral devices connected to the CPU 81 (step S1-4).

Next, the CPU 81 reads the authentication program stored in the ROM 82 and also stores the read authentication program into the RAM 83 (step S1-5). At this time, the CPU 81 obtains a checksum by the ADDSUM system (standard checking function) in accordance with the standard BIOS function of the BIOS, and stores the authentication program into the RAM 83 while performing processing of checking whether or not the storage is performed without an error.

Next, the CPU 81 reads the dice game program from the ROM 82. In this case, the CPU 81 reads data constituting the dice game program by four bytes at a time. Subsequently, the CPU 81 performs authentication for checking and verifying that the read dice game program is authentic (not broken) in accordance with the authentication program stored in the RAM 83 (step S1-6). When properly completing this authentication processing, the CPU 81 writes and stores the dice game program having been the subject to be authenticated (program having been authenticated) into the RAM 83 (step S1-7).

Meanwhile, the CPU 111 of the station 4 first executes the BIOS stored in the ROM 112, and expands compressed data, which is incorporated into the BIOS, into the RAM 113 (step S2-1). The CPU 111 then executes the BIOS expanded into the RAM 113, and diagnoses and initializes a variety of peripheral devices.

Specifically, the CPU 111 diagnoses and initializes the image display 7 (step S2-2). In this processing, the CPU 111 transmits a request signal to the liquid crystal driving circuit 120, and determines whether or not to have received a predetermined response signal.

Next, the CPU 111 diagnoses and initializes the touch panel 35 (step S2-3). In this processing, the CPU 111 transmits a request signal to the touch panel 35, and determines whether or not to have received a predetermined response signal.

Next, the CPU 111 diagnoses and initializes the other peripheral devices connected to the CPU 111 (step S2-4).

Next, the CPU 111 transmits an initial setting signal to the main control portion 80 (step S2-5). The initial setting signal is a signal indicating completion of the diagnosis and initialization of the variety of peripheral devices in the station 4.

After executing the processing of step S2-5, the CPU 111 completes the present subroutine.

The CPU 81 of the main control portion 80 receives the initial setting signal transmitted from the stations 4 in step S2-5 (step S1-8). Subsequently, the CPU 81 determines whether or not to have received the initial setting signals from all the stations 4 (step S1-9).

When determining that the initial setting signal has not been received from a certain station 4, the CPU 81 returns the processing to step S1-8. On the other hand, when determining that the initial setting signals have been received from all the stations 4, the CPU 81 completes the present subroutine.

As just described, according to the gaming machine 1 and the control method of the gaming machine 1, payouts for two types of BETs, that is, a normal payout for the normal BET and a special payout for the side BET, are prepared. Therefore, it is possible to make the player place a BET, with enjoyment of thinking about which BET to place and which payout to obtain so that the interesting aspects of the game can be improved.

Further, with the choices in betting increased, an amount to be betted per one game is expected to increase; thus, the revenue per unit game machine can be increased.

In the side BET, a BET is placed on the order of whether the total value of the outcomes of the dice 70 in each game of a plurality of games is even or odd. Therefore, the player having placed the side BET continues the game until completion of the plurality of games. Hence it is possible to make the player play the game for a long period of time by making him or her place the side BET.

When it is determined that all the outcomes of the dice 70 are the same, the side BET even-odd information is cleared. Namely, when all the outcomes of the dice become the same, a loss of the player having placed the side BET is settled. It is therefore possible to make the player having placed the side BET excited about whether or not all the outcomes of the dice will become the same.

Further, since a loss of the player having placed the side BET is settled when all the outcomes of the dice have become the same, benefit ratio of the gaming parlor is improved.

In the present embodiment, the case has been described where the side BET is placed on the order of whether the total value of the outcomes of the dice 70 in each game of three games is even or odd. However, in the present invention, the number of games is not particularly restricted; for example, the side BET may be placed on the order of whether the total value of the outcomes of the dice 70 in each game of ten games is even or odd. Further, the number of games may not be fixed and may be made selectable by the player.

Although the case has been described in the present embodiment where the real dice 70 roll in the gaming portion 3, a configuration may be adopted in the present invention in which a main image display is installed separately from the image display provided in the station and an image showing the state of rolling of the dice is displayed to the main image display, without using real dice.

In this case, the CPU 81 is connected, through the I/O interface 90, with a random number generator 130B and a liquid crystal driving circuit 120B equivalent to the liquid crystal driving circuit 120 provided in the station 4. Further, the CPU 81 is connected with a main image display 701 through the liquid crystal driving circuit 120B.

The CPU 81 determines the outcome of each of the dice 70 by means of a random number. The CPU then displays an image showing the state of rolling of the dice 70 to the main image display 701. The CPU 81 further displays an image showing the dice 70 in a state of stopping with the outcomes of the determined value to the main image display 701.

Although the embodiment of the present invention in which the real dice 70 rotate in the gaming portion 3 has been described in the above, the present invention may also include a configuration in which the real dice are not used but an image showing dice in a state of rolling is displayed to the image display provided in the station.

In this case, the CPU is connected to a random number generator 130B through the I/O interface 90.

The CPU 81 determines the outcome of each of the dice 70 by means of a random number, and transmits information on the determined value of the outcome of each of the dice 70 to each station 4. Each station 4 then displays an image showing the dice 70 in a state of rolling to the image display 7. Further, an image showing the dice 70 in a state of stopping is displayed to the image display 7 based on the received information on the value of the outcome of each of the dice 70.

Although the case has been described in the present embodiment where the image display is not installed in any place other than the station 4, a configuration may be adopted in the present invention in which the main image display is installed in the gaming machine separately from the image display provided in the station and an image showing the state of rolling of the dice in the gaming portion is displayed to the main image display.

In this case, the CPU 81 is connected, through the I/O interface 90, with a dice photographing device 701 having a CCD camera 17B and the liquid crystal driving circuit 120B equivalent to the liquid crystal driving circuit 120 provided in the station 4. Further, the CPU 81 is connected with the dice photographing device 701 through the liquid crystal driving circuit 120B. The CCD camera 17B provided in the dice photographing device 701 is installed at an angle that allows photographing of the gaming portion 3.

The CPU 81 displays an image showing the state of rolling of the dice 70 in the gaming portion 3 to the main image display 701, based on the signal transmitted from the dice photographing device 701.

Although the case has been described in the present embodiment where the image of the dice 70 is not displayed to the image display 7 provided in the station 4, the present invention may also include a configuration in which an image showing the dice in a state of rolling in the gaming portion is displayed to the image display provided in the station.

In this case, the CPU 81 is connected to a dice photographing device 701 equipped with a CCD camera 17B through the I/O interface 90. The CCD camera 17B in the dice photographing device 701 is installed at such an angle as to be able to photograph the gaming portion 3.

The CPU 81 transmits a signal transmitted from the dice photographing device 701 to each station. The CPU 111 then displays to the image display 7 an image showing the dice 70 in a state of rolling in the gaming portion 3 based on the signal received from the main control portion 80.

Although the case has been described in the present embodiment where the outcomes of the dice 70 are detected using the CCD camera 17, the method for detecting the outcomes of the dice is not particularly limited in the present invention. For example, an identifiable device, such as a device reactive to magnetism, may be previously imbedded inside each of the dice, and its outcome may be detected by the use of a magnetic change in the device. Moreover, an optical sensor may be used to detect the outcomes of the dice.

Although the case has been described in the present embodiment where the dice 70 are rolled using the rotating-plate driving motor 300A, the stopping-plate driving motor 300B and the carriage driving motor 300C, the method for rolling the dice is not particularly limited; for example, a configuration may be adopted in which the dice are rolled on a vibration plate. Further, the dice may not be collected, but may be in a constantly exposed state inside the gaming portion.

Although the case has been described in the present embodiment where the number of the dice 70 is three, the number of dice is not restricted in the present invention, and for example, the number of dice may be five.

Although the case has been described in the present embodiment where the controller in the present invention includes the CPU 81 provided in the main control portion 80 and the CPU 111 provided in the station 4, the controller in the present invention may be configured by a single CPU.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine, comprising:

a gaming portion in which a plurality of dice roll and stop;

a memory capable of storing data relating to a game;

a station having an input device with which a normal BET and a side BET can be placed, said normal BET being able to be placed on the outcomes of said plurality of dice which stop in one game, said side BET being able to be placed on the order of whether the total value of the outcomes of said plurality of dice in each game of a plurality of consecutive games is even or odd; and a controller, said controller programmed to execute the processing of (A) accepting said normal BET from said input device provided in said station, (B) accepting said side BET from said input device provided in said station, said side BET being capable of being accepted each time a game is executed, and said plurality of consecutive games including a predetermined number of games that begin from a game where said side BET is initially accepted, (C) storing side BET even-odd information showing the appearance order of even or odd values into said memory, based on the side BET accepted in said processing (B), (D) rolling and stopping said plurality of dice in said gaming portion, (E) offering a normal payout based on the outcomes of said plurality of dice stopped in said processing (D) and said normal BET accepted in said processing (A), (F) determining whether the total value of the outcomes of said plurality of dice is even or odd in each game of said plurality of consecutive games, based on the outcomes of said plurality of dice stopped in said processing (D) after having accepted said side BET in said processing (B), (G) storing even-odd information showing the even value or odd value determined in said processing (F) into said memory, in each game, and (H) offering a special payout, when the order of even or odd values shown by said side BET even-odd information for said plurality of consecutive games stored into said memory in said processing (C) matches the order of even or odd values determined by all of said even-odd information for said plurality of consecutive games stored into said memory in said processing (G) after having accepted the side BET in said processing (B).

2. The gaming machine according to claim 1, wherein said controller is further programmed to execute the processing of (I) determining whether or not all the outcomes of said plurality of dice stopped in said processing (D) are the same, and (J) clearing said side BET even-odd information stored into said memory in said processing (C), when determining in said processing (I) that all the outcomes of said plurality of dice are the same.

3. A gaming machine, comprising:

an image display capable of displaying an image;

a memory capable of storing data relating to a game;

a station having an input device with which a normal BET and a side BET can be placed, said normal BET being able to be placed on the outcomes of a plurality of dice stop-displayed in one game to the image display, said side BET being able to be placed on the order of whether the total value of the outcomes of said plurality of dice in each game of a plurality of consecutive games is even or odd; and a controller, said controller programmed to execute the processing of (A) accepting said normal BET from said input device provided in said station, (B) accepting said side BET from said input device provided in said station, said side BET being capable of being accepted each time a game is executed, and said plurality of consecutive games including a predetermined number of games that begin from a game where said side BET is initially accepted, (C) storing side BET even-odd information showing the appearance order of even or odd values into said memory, based on the side BET accepted in said processing (B), (D) deciding the outcomes of said plurality of dice to be displayed to said image display, (E) displaying to said image display at least an image showing a state of stopping of said plurality of dice with the outcomes determined in said processing (D), (F) offering a normal payout based on the outcomes of said plurality of dice determined in said processing (D) and said normal BET accepted in said processing (A), (G) determining whether the total value of the outcomes of said plurality of dice is even or odd in each game of said plurality of consecutive games, based on the outcomes of said plurality of dice determined in said processing (D) after having accepted said side BET in said processing (B), (H) storing even-odd information showing the even value or odd value determined in said processing (G) into said memory, in each game, and (I) offering a special payout, when the order of even or odd values shown by said side BET even-odd information for said plurality of consecutive games stored into said memory in said processing (C) matches the order of even or odd values determined by all of said even-odd information for said plurality of consecutive games stored into said memory in said processing (H) after having accepted the side BET in said processing (B).

4. The gaming machine according to claim 3, wherein said controller is further programmed to execute the processing of (J) determining whether or not all the outcomes of said plurality of dice stopped in said processing (D) are the same, and (K) clearing said side BET even-odd information stored into said memory in said processing (C), when determining in said processing (J) that all the outcomes of said plurality of dice are the same.

5. A control method of a gaming machine, said control method comprising the steps of:

(A) accepting a normal BET from an input device with which said normal BET and a side BET can be placed, said normal BET being able to be placed on the outcomes of a plurality of dice which stop in one game, said side BET being able to be placed on the order of whether the total value of the outcomes of said plurality of dice in each game of a plurality of consecutive games is even or odd, said input device being provided in a station;

(B) accepting said side BET from said input device provided in said station, said side BET being capable of being accepted each time a game is executed, and said plurality of consecutive games including a predetermined number of games that begin from a game where said side BET is initially accepted;

(C) storing side BET even-odd information showing the appearance order of even or odd values into a memory capable of storing data relating to a game, based on the side BET accepted in said step (B);

(D) rolling and stopping said plurality of dice in a gaming portion in which said plurality of dice roll and stop;

(E) offering a normal payout based on the outcomes of said plurality of dice stopped in said step (D) and said normal BET accepted in said step (A);

(F) determining whether the total value of the outcomes of said plurality of dice is even or odd in each game of said plurality of consecutive games, based on the outcomes of said plurality of dice stopped in said step (D) after having accepted said side BET in said step (B);

(G) storing even-odd information showing the even value or odd value determined in said step (F) into said memory, in each game, and (H) offering a special payout, when the order of even or odd values shown by said side BET even-odd information for said plurality of consecutive games stored into said memory in said step (C) matches the order of even or odd values determined by all of said even-odd information for said plurality of consecutive games stored into said memory in said step (G) after having accepted the side BET in said step (B).

6. A control method of a gaming machine, said control method comprising the steps of:

(A) accepting a normal BET from an input device with which that said normal BET and a side BET can be placed, said normal BET being able to be placed on the outcomes of a plurality of dice stop-displayed in one game to an image display capable of displaying an image, said side BET being able to be placed on the order of whether the total value of the outcomes of said plurality of dice in each game of a plurality of consecutive games is even or odd, said input device being provided in a station;

(B) accepting said side BET from said input device provided in said station, said side BET being capable of being accepted each time a game is executed, and said plurality of consecutive games including a predetermined number of games that begin from a game where said side BET is initially accepted;

(C) storing side BET even-odd information showing the appearance order of even or odd values into a memory capable of storing data relating to a game, based on the side BET accepted in said step (B);

(D) determining the outcomes of said plurality of dice to be displayed to said image display;

(E) displaying to said image display at least an image showing a state of stopping of said plurality of dice with the outcomes determined in said step (D);

(F) offering a normal payout based on the outcomes of said plurality of dice determined in said step (D) and said normal BET accepted in said step (A);

(G) determining whether the total value of the outcomes of said plurality of dice is even or odd in each game of said plurality of consecutive games, based on the outcomes of said plurality of dice determined in said step (D) after having accepted said side BET in said step (B);

(H) storing even-odd information showing the even value or odd value determined in said step (G) into said memory, in each game, and (I) offering a special payout, when the order of even or odd values shown by said side BET even-odd information for said plurality of consecutive games stored into said memory in said step (C) matches the order of even or odd values determined by all of said even-odd information for said plurality of consecutive games stored into said memory in said step (H) after having accepted the side BET in said step (B).

7. A gaming machine, comprising:

a gaming portion in which a plurality of dice roll and stop;

a memory capable of storing data relating to a game;

a plurality of stations, each of said plurality of stations having an input device with which a normal BET and a side BET can be placed, said normal BET being able to be placed on the outcomes of said plurality of dice which stop in one game, said side BET being able to be placed on the order of whether the total value of the outcomes of said plurality of dice in each game of a plurality of consecutive games is even or odd; and a controller, said controller programmed to execute the processing of (A) accepting said normal BET from said input device provided in at least one of said plurality of stations, (B) accepting said side BET from said input device provided in at least one of said plurality of stations, said side BET being capable of being accepted each time a game is executed, and said plurality of consecutive games including a predetermined number of games that begin from a game where said side BET is initially accepted, (C) storing side BET even-odd information showing the appearance order of even or odd values into said memory, based on the side BET accepted in said processing (B), (D) rolling and stopping said plurality of dice in said gaming portion, (E) offering a normal payout based on the outcomes of said plurality of dice stopped in said processing (D) and said normal BET accepted in said processing (A), (F) determining whether the total value of the outcomes of said plurality of dice is even or odd in each game of said plurality of consecutive games, based on the outcomes of said plurality of dice stopped in said processing (D) after having accepted said side BET in said processing (B), (G) storing even-odd information showing the even value or odd value determined in said processing (F) into said memory, and (H) offering a special payout to a station in which a predetermined condition is satisfied, among said plurality of stations, wherein the predetermined condition is satisfied when the order of even or odd values shown by said side BET even-odd information for said plurality of consecutive games stored into said memory in said processing (C) matches the order of even or odd values determined by all of said even-odd information for said plurality of consecutive games stored into said memory in said processing (G) after having accepted the side BET in said processing (B).

* * * * *